(12) United States Patent
Iyer et al.

(10) Patent No.: US 11,197,322 B2
(45) Date of Patent: Dec. 7, 2021

(54) EMULATING COLLISIONS IN WIRED LOCAL AREA NETWORKS AND RELATED SYSTEMS, METHODS, AND DEVICES

(71) Applicant: Microchip Technology Incorporated, Chandler, AZ (US)

(72) Inventors: Venkatraman Iyer, Austin, TX (US); Dixon Chen, Guangdong (CN); John Junling Zang, Guangdong (CN); Michael Rentschler, Baden-Wuerttemberg (DE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/843,648

(22) Filed: Apr. 8, 2020

(65) Prior Publication Data
US 2020/0351943 A1  Nov. 5, 2020

Related U.S. Application Data

(60) Provisional application No. 62/842,873, filed on May 3, 2019.

(51) Int. Cl.
*H04W 74/08* (2009.01)

(52) U.S. Cl.
CPC .............................. *H04W 74/0816* (2013.01)

(58) Field of Classification Search
CPC .................................................. H04W 74/0816
See application file for complete search history.

(56) References Cited

U.S. PATENT DOCUMENTS

| | | |
|---|---|---|
| 4,739,276 A | 4/1988 | Graube |
| 4,970,466 A | 11/1990 | Bolles et al. |
| 5,134,377 A | 7/1992 | Reddy et al. |
| 5,305,459 A | 4/1994 | Rydel |
| 5,357,145 A | 10/1994 | Segaram |
| 5,381,348 A | 1/1995 | Ernst et al. |
| 5,784,573 A | 7/1998 | Szczepanek et al. |
| 5,859,554 A | 1/1999 | Higashisaka et al. |
| 5,892,893 A | 4/1999 | Hanf et al. |

(Continued)

FOREIGN PATENT DOCUMENTS

| | | |
|---|---|---|
| CN | 101127928 A | 2/2008 |
| EP | 0620664 | 10/1994 |

(Continued)

OTHER PUBLICATIONS

International Search Report for International Application No. PCT/US2020/027275, dated Jun. 26, 2020, 6 pages.

(Continued)

*Primary Examiner* — James P Duffy
(74) *Attorney, Agent, or Firm* — TraskBritt

(57) ABSTRACT

Various embodiments relate to wired local area networks. A method may include detecting, at a node in a wired local area network, at least one event. A physical layer device of the network node is configured to implement a physical level collision avoidance (PLCA) sublayer. The at least one event may include at least one of an amount of data stored in a first-in-first-out (FIFO) buffer of the node being at least a threshold amount, and a received packet being a precision time protocol (PTP) packet incurring variable delay. The method may further include emulating a collision at the node in response to the at least one detected event.

20 Claims, 13 Drawing Sheets

(56) References Cited

U.S. PATENT DOCUMENTS

| | | |
|---|---|---|
| 6,029,202 A | 2/2000 | Frazier et al. |
| 6,115,831 A | 9/2000 | Hanf et al. |
| 6,215,816 B1 | 4/2001 | Gillespie et al. |
| 6,459,739 B1 | 10/2002 | Vitenberg |
| 6,479,983 B1 | 11/2002 | Ebiya |
| 6,691,241 B1 | 2/2004 | Taylor |
| 6,735,217 B1 | 5/2004 | Webber et al. |
| 6,920,132 B1 | 7/2005 | Lo |
| 6,973,094 B1 | 12/2005 | Holloway et al. |
| 7,110,423 B1 | 9/2006 | Sethuram et al. |
| 7,558,348 B1 | 7/2009 | Liu et al. |
| 8,243,752 B2 | 8/2012 | Barkan et al. |
| 8,935,125 B1 | 1/2015 | Fu et al. |
| 9,454,212 B1 | 9/2016 | Schulze |
| 9,628,082 B1 | 4/2017 | Smith et al. |
| 9,696,361 B1 | 7/2017 | Sun et al. |
| 10,684,977 B1 | 6/2020 | Seger et al. |
| 2003/0061341 A1 | 3/2003 | Loh et al. |
| 2003/0200306 A1 | 10/2003 | Park et al. |
| 2003/0225802 A1 | 12/2003 | Ruthstein et al. |
| 2004/0145500 A1 | 7/2004 | Huebl |
| 2004/0240598 A1 | 12/2004 | Yin |
| 2004/0251912 A1 | 12/2004 | Pharn et al. |
| 2005/0078683 A1 | 4/2005 | Page |
| 2005/0128826 A1 | 6/2005 | Kwack et al. |
| 2006/0109784 A1 | 5/2006 | Weller et al. |
| 2006/0181283 A1 | 8/2006 | Wajcer et al. |
| 2006/0209710 A1 | 9/2006 | Watanabe |
| 2007/0008011 A1 | 1/2007 | Thurston |
| 2007/0121624 A1 | 5/2007 | Kimbrough et al. |
| 2007/0133586 A1 | 6/2007 | Ojard et al. |
| 2007/0160087 A1 | 7/2007 | Findlater et al. |
| 2008/0024178 A1 | 1/2008 | Kim et al. |
| 2008/0037693 A1 | 2/2008 | Andrus et al. |
| 2008/0117810 A1 | 5/2008 | Stott et al. |
| 2008/0159330 A1 | 7/2008 | Deng et al. |
| 2008/0186996 A1 | 8/2008 | Powell et al. |
| 2009/0003835 A1 | 1/2009 | Arahira |
| 2009/0201936 A1 | 8/2009 | Dumet et al. |
| 2011/0170476 A1 | 7/2011 | Shapira et al. |
| 2012/0087662 A1 | 4/2012 | Suzuki et al. |
| 2012/0229214 A1 | 9/2012 | Kasanyal |
| 2012/0307637 A1 | 12/2012 | Diab |
| 2013/0021063 A1 | 1/2013 | Kwon |
| 2013/0101058 A1 | 4/2013 | Hummel |
| 2013/0229926 A1 | 9/2013 | Lu et al. |
| 2013/0329773 A1 | 12/2013 | Cheng et al. |
| 2014/0073352 A1 | 3/2014 | Aldana et al. |
| 2014/0177653 A1 | 6/2014 | Tzeng |
| 2014/0268141 A1 | 9/2014 | Pariseau |
| 2014/0281626 A1 | 9/2014 | Younger et al. |
| 2015/0063375 A1 | 3/2015 | Tzeng et al. |
| 2015/0124797 A1 | 5/2015 | Babitch et al. |
| 2015/0131708 A1 | 5/2015 | Cornett et al. |
| 2015/0145563 A1 | 5/2015 | Pardoen |
| 2015/0145581 A1 | 5/2015 | Palmer et al. |
| 2015/0237178 A1 | 8/2015 | Zhang |
| 2016/0094362 A1 | 3/2016 | Brennan |
| 2016/0323287 A1 | 11/2016 | Kishikawa et al. |
| 2017/0111069 A1 | 4/2017 | Dafesh et al. |
| 2018/0034658 A1 | 2/2018 | Kinage et al. |
| 2018/0165056 A1 | 6/2018 | Lay et al. |
| 2018/0181525 A1 | 6/2018 | Iyer et al. |
| 2018/0262526 A1 | 9/2018 | Jain et al. |
| 2018/0314285 A1 | 11/2018 | Susanto et al. |
| 2019/0179398 A1 | 6/2019 | Arora et al. |
| 2019/0230705 A1 | 7/2019 | Beruto et al. |
| 2019/0261420 A1 | 8/2019 | Pannell et al. |
| 2019/0268941 A1 | 8/2019 | Axer et al. |
| 2019/0313446 A1 | 10/2019 | Kim et al. |
| 2019/0357146 A1 | 11/2019 | Kim et al. |
| 2019/0363991 A1 | 11/2019 | Sostawa et al. |
| 2020/0371579 A1 | 11/2020 | Selvam et al. |
| 2021/0055963 A1 | 2/2021 | An et al. |
| 2021/0056060 A1 | 2/2021 | An et al. |
| 2021/0058168 A1 | 2/2021 | Zang et al. |
| 2021/0058177 A1 | 2/2021 | Iyer et al. |
| 2021/0058224 A1 | 2/2021 | Iyer et al. |
| 2021/0058269 A1 | 2/2021 | Zang et al. |
| 2021/0058498 A1 | 2/2021 | Iyer et al. |
| 2021/0058965 A1 | 2/2021 | Chen et al. |

FOREIGN PATENT DOCUMENTS

| | | |
|---|---|---|
| EP | 1388975 A1 | 2/2004 |
| EP | 1940086 A1 | 7/2008 |
| EP | 3094044 A1 | 11/2016 |
| EP | 3573287 A1 | 11/2019 |

OTHER PUBLICATIONS

International Written Opinion for International Application No. PCT/US2020/027275, dated Jun. 26, 2020, 10 pages.

LAN/MAN Standards Committee of the IEEE Computer Society, "Draft Standard for Ethernet Amendment: Physical Layer Specifications and Management Parameters for 10 Mb/s Operation and Associated Power Delivery over a Single Balanced Pair of Conductors," IEEE Draft, P802.3cg/D2.4, Feb. 21, 2019, The Institute of Electrical and Electronics Engineers, Inc., pp. 1-60, New York.

Meier, "Analysis of Worst Case Latencies in an 10 Mbit Ethernet network with PLCA", IEEE Draft, V4, Jan. 17, 2018, pp. 1-11.

Pannell et al., "Quality of Service for PLCA", NXP, May 2018 (May 24, 2018), pp. 1-37, vol. 802.1, No. v02 24, Pittsburg.

U.S. Appl. No. 62/881,720, filed Aug. 1, 2019, titled "Single Pair Ethernet Physical Layer Architecture and Systems, Devices, and Methods for Implementing the Same", to Iyer et al., 35 pages.

U.S. Appl. No. 62/993,825, filed Mar. 24, 2020, titled "Low Pin Count Handshake Signaling Protocol According to 10BASE-T1X Local and Remote Wake Detect and Related Systems, Methods, and Devices", to Iyer et al., 13 pages.

Fitzgerald: "10BASE-T1L Low Power Idle (802.3cg D2.0)", IEEE-SA, Acuitas Silicon, (Aug. 15, 2018) 9 pages.

Microchip KSZ8061MNX/MNG, "100BASE-T/100BASE-TX Physical Layer Transceiver" Device Document 00002038D (Aug. 15, 2018) 66 pages.

EMULATING COLLISIONS IN WIRED LOCAL AREA NETWORKS AND RELATED SYSTEMS, METHODS, AND DEVICES

CROSS-REFERENCE TO RELATED APPLICATIONS

This application claims priority to U.S. Provisional Patent Application Ser. No. 62/842,873, titled EMULATING COLLISIONS IN AN 10SPE NETWORK, and filed on May 3, 2019, the disclosure of which is hereby incorporated herein in its entirety by this reference.

TECHNICAL FIELD

The present disclosure relates generally to wired local area networks, and more specifically, to emulating collisions in a wired local area network (e.g., a 10SPE network).

BACKGROUND

Various interface standards for connecting computers and external peripherals may be used to provide connectivity at high speeds. A widely used, flexible networking standard for connecting computers (e.g., in Local Area Networks (LANs) and Wide Area Networks (WANs)) is the Ethernet protocol. Ethernet communication generally refers to point-to-point communication within a network of multiple end points. Ethernet generally makes efficient use of shared resources, is easy to maintain and reconfigure, and is compatible across many systems.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
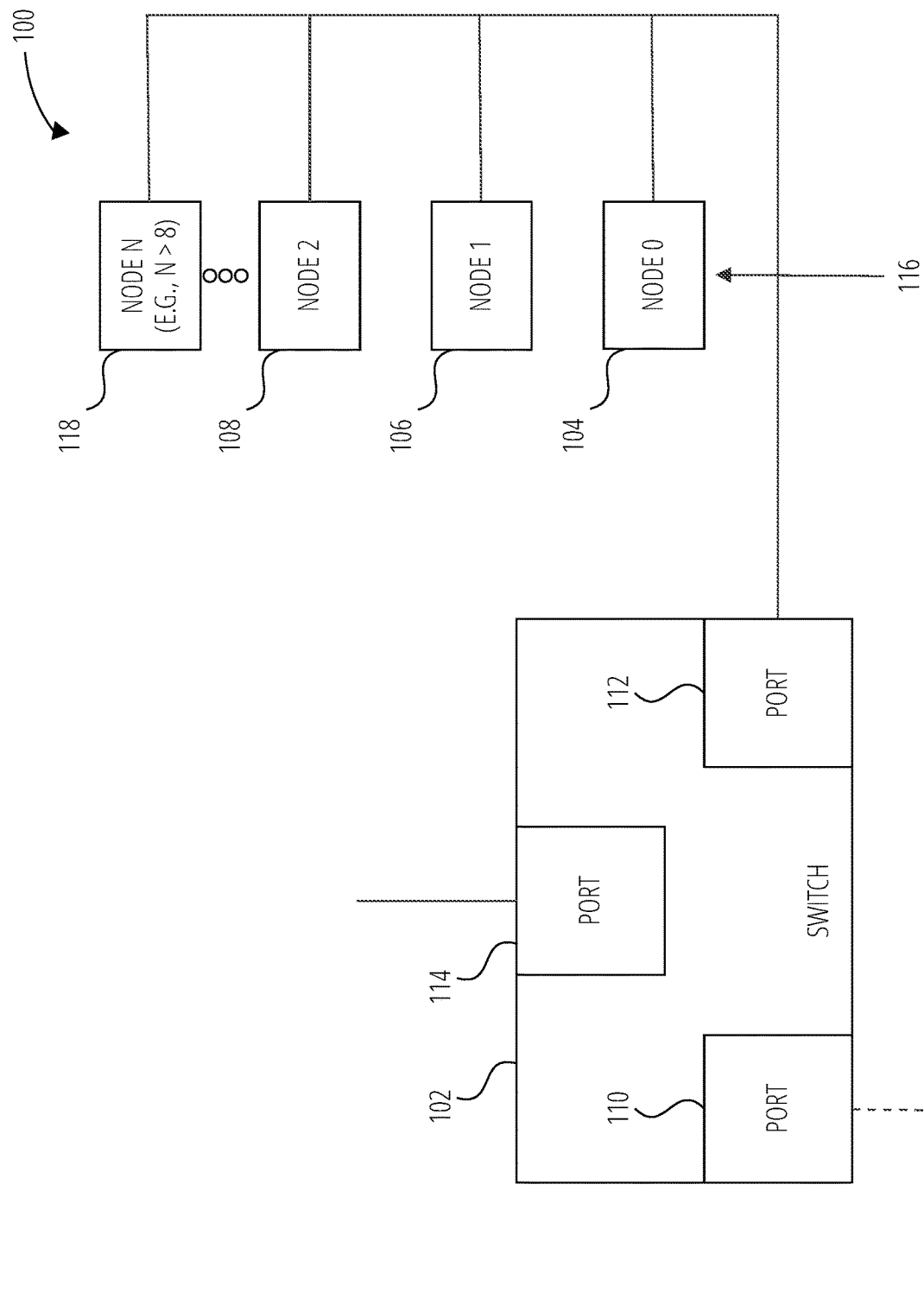
FIG. 1 illustrates an example network including a switch and a number of nodes.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

10SPE (i.e., 10 Mbps Single Pair Ethernet) is a network technology specification currently under development by the Institute of Electrical and Electronics Engineers (IEEE) as IEEE 802.3 cg™. 10SPE may be used to provide a collision free, deterministic transmission on a multi-drop network. The 10SPE specification intends to include an optional physical level collision avoidance (PLCA) reconciliation sublayer, which is used to avoid physical collision on a multi-drop bus.

A vehicle, such as an automobile, a truck, a bus, a ship, and/or an aircraft, may include a vehicle communication network (e.g., a wired local area network such as Ethernet), which may implement 10SPE. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

Automotive subnets may have a small number (e.g., less than or equal to eight) of nodes (e.g., PLCA nodes). However, other applications (e.g., industrial, server backplanes, or Internet of Things) may have or require more nodes. In conventional systems, due to a fundamental constant in PLCA, a node count may be limited. Further, a transmit first-in-first-out (TX FIFO) buffer in PLCA may add a variable delay to media access control sublayer (MAC) frames, thus, in conventional systems, precision time protocol (PTP) functionality of MACs may be unusable.

Various embodiments disclosed herein relate to emulating collisions on a network (e.g., 10SPE multi-drop half duplex subnet) to enhance PLCA functionality. More specifically, various embodiments may relate to emulating a logical collision on a network in response to one or more events (e.g., an amount of data stored in a TX FIFO buffer of a node being at least a predetermined amount and/or a packet received at a node being a precision time protocol (PTP) packet). As used herein, the term "emulated collision" refers to an assertion (e.g., transitioning from a logic level low to a logic level high) of a collision signal (e.g., "COL") by a physical layer device (PHY) of a network node responsive to a threshold amount of data stored in a transmit first-in-first-out (TX FIFO) buffer of the network node or detection of a PTP packet from a MAC. When at least the threshold amount of data is stored in the transmit FIFO buffer, we call the transmit FIFO buffer full. A PTP (precision time protocol) packet is a packet that is used in implementing IEEE 802.1AS or IEEE 1588. The COL may be held in the asserted state (e.g., logic level high) until a transmit enable signal (e.g., "TX_EN") received from the MAC is deasserted, and the PHY may deassert the COL signal following deassertion of the TX_EN signal. In some instances the assertion of the COL may be accompanied by holding asserted (e.g., in a logic level high state) a carrier sense signal (e.g., "CRS") until a transmit opportunity of the network node.

The use of emulated collisions enables an increased number of nodes and allows handling of precision time protocol (PTP) by the MAC when using PLCA. This may be accomplished by physical layer devices according to embodiments disclosed herein by leveraging programmed responses of conventional MAC devices to collisions to solve non-collision issues. Accordingly, physical layer devices according to embodiments disclosed herein may signal a collision (e.g., using the COL signal and CRS signal) in a strategic way to handle an increased number of nodes and PTP packets on the physical layer side.

For example, some embodiments may allow for a subnetwork with a large number (e.g., greater than thirty-two) of nodes using PLCA (e.g., for use with industrial automation, server backplanes, and others). This large number of nodes may be enabled by emulating collisions when the PLCA TX FIFO is full. Accordingly, when a TX FIFO of the network node is full due to accumulation of a relatively large amount of transmit data (e.g., TXD) from the MAC while waiting for a transmit opportunity of the node to transmit the transmit data on the bus, the emulation of the collision (assertion of the COL) may signal to the MAC that a collision occurred, which causes the MAC to wait until the deassertion of the COL and CRS signals.

Further, some embodiments may allow precision time protocol (PTP) packets to be handled at a media access control (MAC) of a node using its native timestamp unit while utilizing PLCA. For example, some embodiments may allow components (e.g., 10SPE controllers/switches) that may not have external timestamping support to use PTP. An emulated collision (assertion of the COL signal) upon detection by the PHY of a PTP frame received from the MAC prevents the use of the TX FIFO in conjunction with the PTP frame when a transmit opportunity is not available, and as a result variable TX FIFO delay is not introduced, enabling a corresponding PTP packet to have known delay through a physical layer device (PHY). More specifically, the MAC is configured to wait until the CRS signal is deasserted to retransmit the PTP packet to the PHY. Since the PHY deasserts the CRS signal at a transmit opportunity of the PHY, the PHY receives the retransmitted PTP packet from the MAC during the transmit opportunity of the PHY, and the PTP packet may be transmitted on a shared transmission medium (e.g., a 10SPE media) immediately without holding the PTP packet in any kind of variable delay buffer.

Various embodiments of the present disclosure are now explained with reference to the accompanying drawings.

FIG. 1 illustrates an example network 100 including a switch 102 and a number N of nodes 116 (e.g., node 104, node 106, node 108, and node 118 without limitation). For example, network 100 may include a wired local area network such as a 10SPE network, which may include a half-duplex, multi-drop network. Further, for example, network 100, and more specifically, one or more nodes 116 of network 100, may include and/or may implement a physical layer collision avoidance (PLCA) sublayer. PLCA is a reconciliaton sublayer between a physical (PHY) layer and a media access control (MAC) layer. In some embodiments PLCA is implemented in the PHY. Network 100 may also be referred to herein as a "subnet" or "subnetwork."

For example, nodes 116 may include one or more sensors, and each of the nodes 116 may include a unique ID (e.g., node 0, node 1, node 2, . . . node N). In some embodiments the number N of the nodes 116 may be greater than eight (e.g., N>8), without limitation. Switch 102, which includes a number of ports (e.g., port 110, port 112, port 114, which are configured for the same or different speeds), may be configured to receive and convey data to different devices (e.g., control units, sensors (nodes), without limitation).

Figure 2:
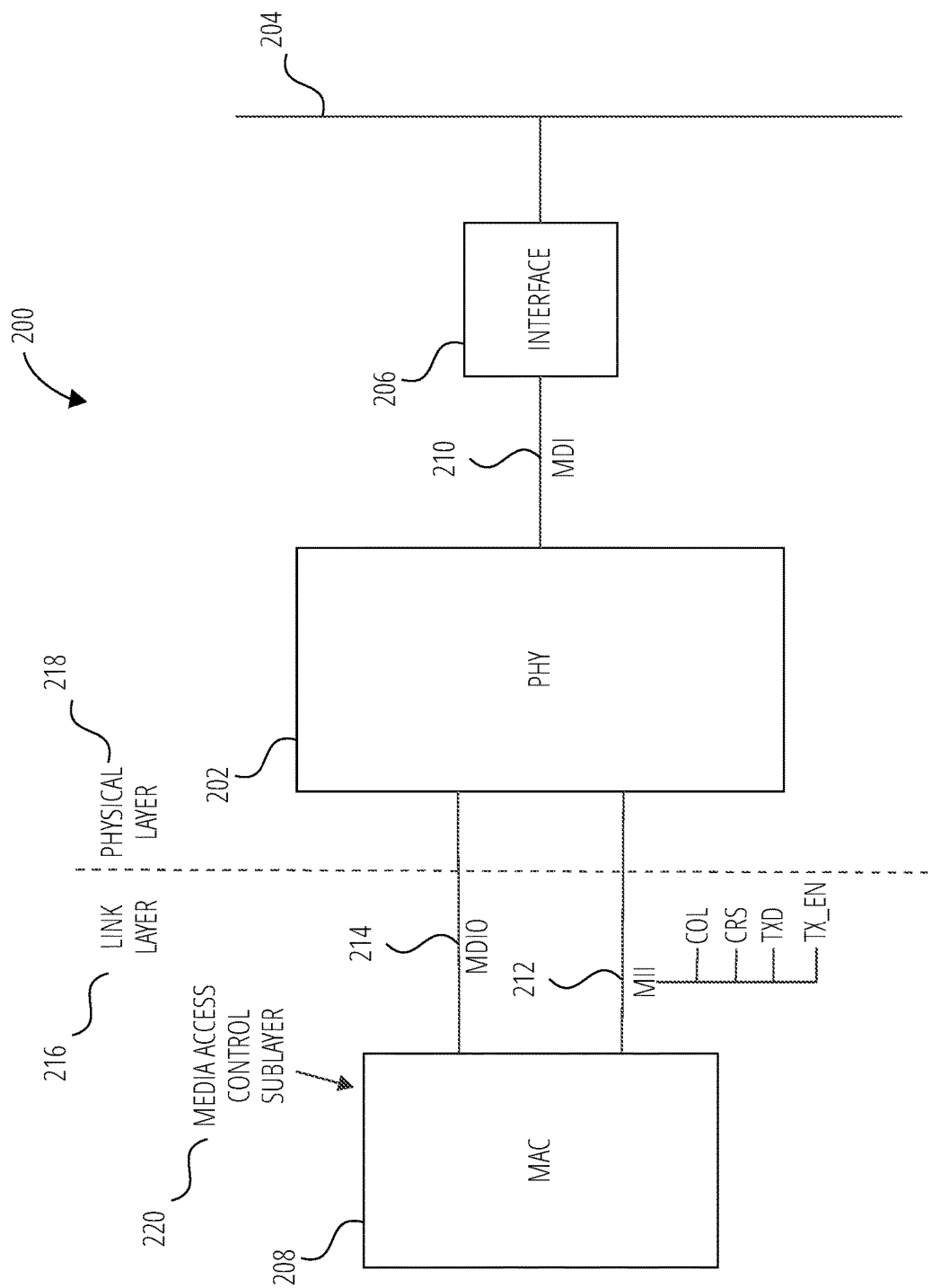
FIG. 2 illustrates an example node including a physical layer (PHY) coupled to a shared transmission medium such as a 10SPE media via an interface.

FIG. 2 illustrates an example node 200 including a media access control (MAC) device 208 residing in a media access control sublayer 220 of a link layer 216 and a physical layer device (PHY) 202 residing in a physical layer 218 of a wired local area network (e.g., the network 100 of FIG. 1). The PHY 202 is coupled to a shared transmission medium such as a 10SPE media 204 via an interface 206. The 10SPE media 204 may include a physical medium that is a communication path for nodes that are part of a network (e.g., network 100), including nodes that include respective instances of a PHY 202 and a MAC 208. As a non-limiting example, 10SPE media 204 may include a single twisted pair such as used for single pair Ethernet. Devices that are on a baseband network (e.g., a multidrop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant. So, media access control methods are used to handle contention for 10SPE media 204.

In some embodiments, one of the nodes 116 (e.g., node 104, node 106, node 108, and node 118 (see FIG. 1)) may include node 200. The MAC 208 may include a controller coupled to PHY 202 via a media independent interface (MII interface 212) and/or a management data input/output interface (MDIO interface 214). Further, for example, PHY 202 may be coupled to interface 206 via a medium-dependent interface (MDI interface 210). The PHY 202 may be configured to provide, among other signals, a collision signal COL and a carrier sense signal CRS to the MAC 208 through the MII interface 212. The MAC 208 may be configured to provide, among other signals, transmit data bits TXD (e.g., TXD0-TXD3) and a transmit enable signal TX_EN to the PHY 202. As the MAC 208 is configured to perform link layer operations, the PHY 202 is configured to receive the TXD and TX_EN signals from the MAC 208, which is a link layer 216.

According to at least some embodiments, a network (e.g., network 100) may utilize carrier-sense multiple access with collision detection (CSMA/CD) media access control. Further, in some embodiments, PLCA may be utilized (e.g., to avoid physical (electrical) collision).

During a contemplated operation of a network, a beacon (e.g., generated via a master node) may initiate a bus cycle, and each node of the network has a transmit opportunity (TO) (e.g., 2 bytes), which TO may be allocated in order of its ID (i.e., in a round robin fashion) during the bus cycle. More specifically, node 0 (e.g., a master node) (node 104) may have a TO, followed by a TO for node 1 (node 106), followed by a TO for node 2 (node 108), followed by a TO for node N (node 118) (FIG. 1), and so on.

Figure 3:
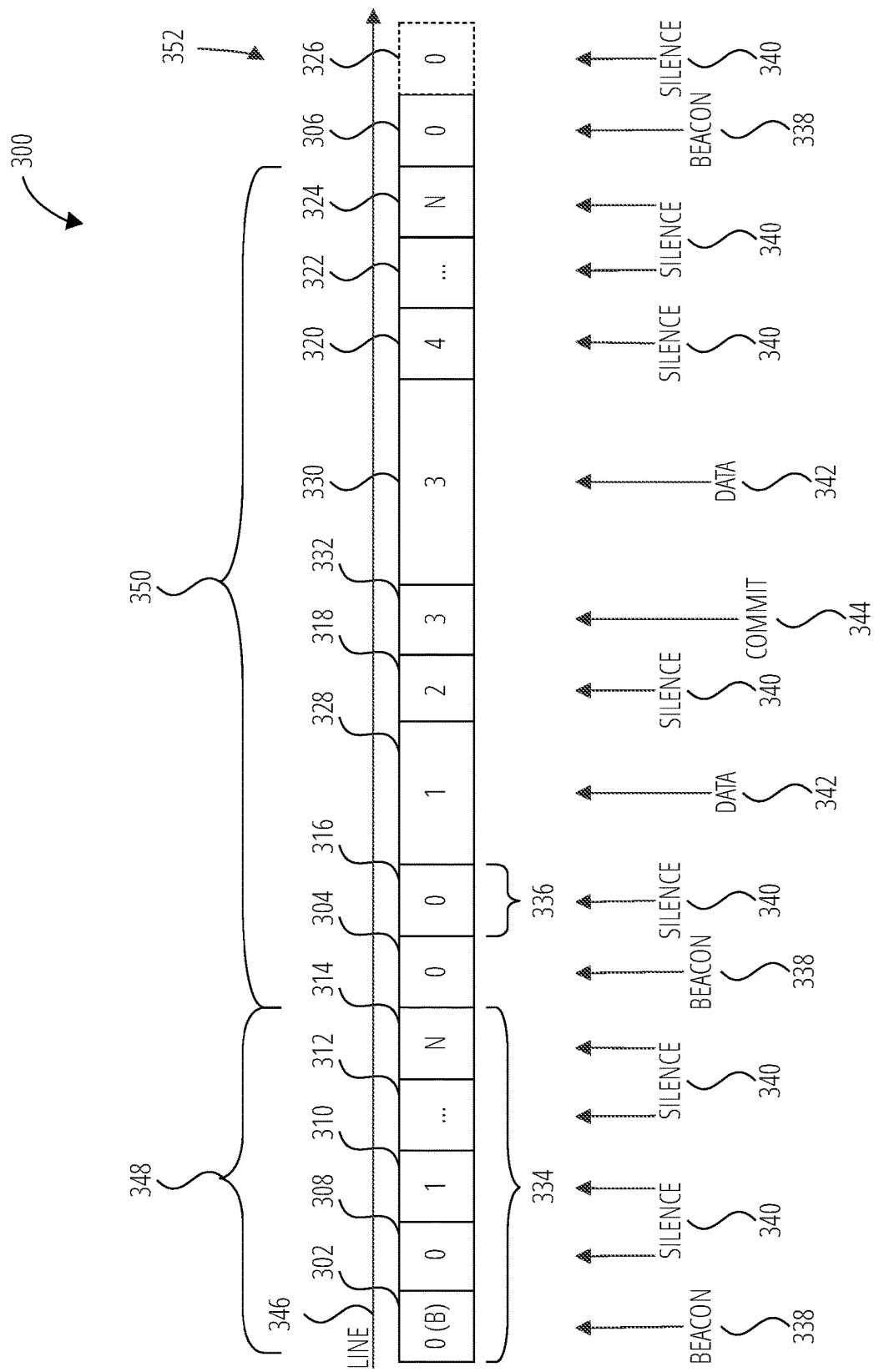
FIG. 3 depicts a number of bus cycles for a line of a physical level collision avoidance (PLCA) sublayer, according to some embodiments.

FIG. 3 depicts a number of bus cycles 300 for a line 346 (e.g., the 10SPE media 204 of FIG. 2) of a physical level collision avoidance (PLCA) sublayer, according to some embodiments. Specifically, FIG. 3 illustrates a first bus cycle 348 and a second bus cycle 350. The bus cycles 300 include a plurality of time slots 352 (e.g., time slot 302 through time slot 332) of the line 346. The time slots 352 are each labeled with a number (e.g., 0, 1, 2, 3, 4, N, the number N being one less than a number of network nodes) corresponding to one of various network nodes (e.g., node 0, node 1, node 2, node 3, node 4, . . . node N, for example, the nodes 116 of FIG. 1) that is to communicate during the respective one of the time slots 352. By way of non-limiting example, the number N may be seven (7), corresponding to eight (8) network nodes. The nodes 116 may include these network nodes. Also, FIG. 3 indicates whether the communication in each of the bus cycles 300 includes a beacon 338, silence 340, data 342, or a commit signal 344. For example, as shown in FIG. 3, a beacon 338 may be sent by a node 0 (e.g., a master node) during each time slot 302, time slot 304, and time slot 306. Also, silence 340 may be present on the line 346 during each of time slot 308 through time slot 326 (i.e., data is not transmitted during time slot 306 through time slot 326). Further, in time slot 332 a commit signal 344 may be sent (i.e., by a node 3 to, for example, capture the bus before sending a packet of data 342). Data 342 may be sent during time slot 328 and time slot 330. More specifically, a node 1 may send data 342 during time slot 328, and a node 3 may send data 342 during time slot 330.

During each of the bus cycles 300, the master node (node 0) may send out beacon 338, which is followed by one or more time slots 352 for each of the nodes (node 0 through node N). As shown in FIG. 3, the first bus cycle 348 includes the time slot 302 having the beacon 338 transmitted by node 0, then silence 340 for time slot 308 through time slot 314 during which node 0 through node N remain silent (i.e., silence 340) during time slot 308 corresponding to node 0, time slot 310 corresponding to node 1, time slots 312 corresponding to nodes 2 to N−1, and time slot 314 corresponding to node N. It should be noted that where each of the nodes takes only a minimum time slot length 336 during the bus cycle, as is the case with first bus cycle 348, the bus cycle will have a minimum bus cycle length, as shown in relation to first bus cycle 334.

After the first bus cycle 348 the second bus cycle 350 may occur. During the second bus cycle 350 the master node (e.g., node 0) may send out a beacon 338 during time slot 304, then silence 340 during a time slot 316 of minimum time slot length 336 corresponding to node zero. The second bus cycle 350 includes data 342 transmitted by node 1 during time slot 328, then silence 340 for time slot 318 corresponding to node 2. At time slot 332 the second bus cycle 350 includes a commit signal 344 (e.g., to capture the bus before sending a packet of data 342) followed by time slot 330 carrying data 342, the commit signal 344 and data 342 transmitted by node 3. The second bus cycle 350 further includes silence 340 transmitted during each of time slot 320 corresponding to node 4, time slot 322 corresponding to node 5 to node N 1, and time slot 324 corresponding to node N. An additional beacon 338 at time slot 306 and individual node transmissions starting with node zero at time slot 326, illustrated as silence 340, then follows second bus cycle 350.

Figure 4:
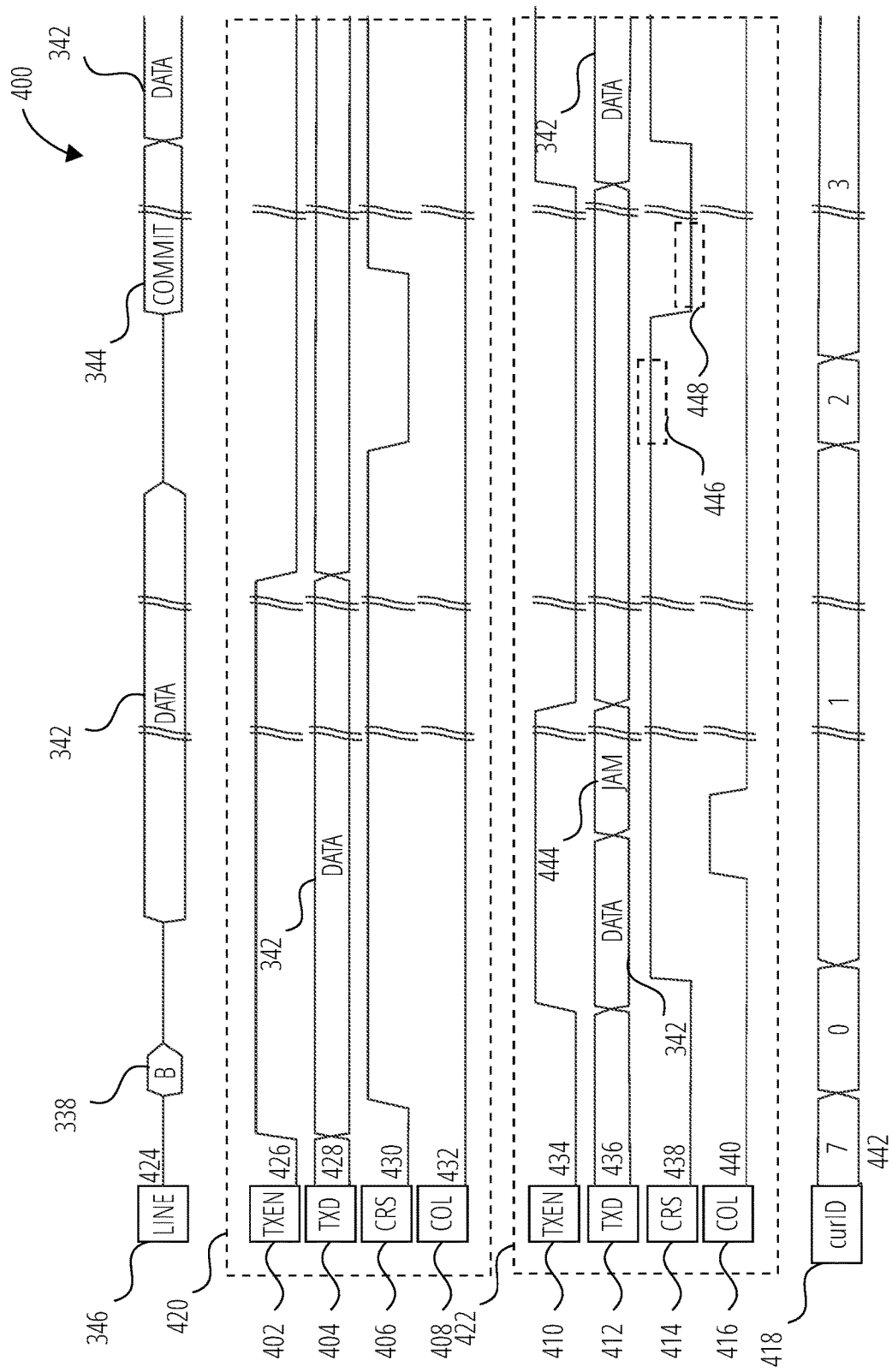
FIG. 4 illustrates a signal timing diagram associated with a second bus cycle shown in FIG. 3, according to some embodiments.

FIG. 4 illustrates a signal timing diagram 400 associated with the second bus cycle 350 (e.g., of the PLCA sublayer) shown in FIG. 3, according to some embodiments. By way of non-limiting example, the signal timing diagram 400 may be associated with a bus with eight nodes. The signal timing diagram 400 illustrates line signals 424 on the line 346 of FIG. 3, and node 1 signals 420, node 3 signals 422, and current node identification information (curID information) 442. In some embodiments the PHY of one or more of the nodes may store the curID information 442 in data storage 418 (e.g., data registers, volatile data storage, non-volatile data storage) to enable the PHY to keep track of which node currently has a transmit opportunity. The node 1 signals 420 include signals of an MII interface (e.g., MII interface 212 of FIG. 2) including transmit enable signal (TXEN signals 426 from a MAC) on a TXEN line 402, transmit data signal (TXD signals 428 from the MAC) on a TXD line 404, carrier sense signal (CRS signals 430 to the MAC) on a CRS line 406, and collision detect signal (COL signals 432 to the MAC) on a COL line 408. Similarly, the node 3 signals 422 include signals of a MII interface (e.g., MII interface 212 of FIG. 2) including TXEN signal 434 on a TXEN line 410, TXD signal 436 on a TXD line 412, CRS signal 438 on a CRS line 414, and COL signal 440 on a COL line 416 (e.g., of a MII interface between the PHY and the MAC of the node 3). The curID information 442 indicates an identification indicating which of the nodes (e.g., node 0 through node 7) is designated to transmit data 342 on the line 346 (i.e., which node currently is assigned a transmit opportunity).

FIG. 4 illustrates an example of signaling of a PHY of node 3 responsive to a logical collision between node 3 communications and node 1 communications, and a reaction of the MAC of node 3 to the collision signaling of the PHY of node 3. Although FIG. 4 does not illustrate an emulated collision, FIG. 4 illustrates the programmed response of the MAC of node 3 to a collision signaled by the PHY of node 3 to illustrate how a MAC will respond to an emulated collision. This programmed response of the MAC to collision signaling from the PHY leveraged in embodiments discussed below. In this example, a first node (node 1 including PHY #1) and a third node (node 3 including PHY #3) have data to transmit in their respective transmit FIFO as transmit data 342, and other nodes are silent. In this example, node 1 may defer its transmission until its own timeslot (transmit opportunity) is available, and node 3 may signal a collision during the timeslot when node 1 is transmitting.

As illustrated in FIG. 4, following a previous bus cycle (e.g., first bus cycle 348 of FIG. 3) finishing with a node 7, designated by the curID information 442, on the data storage 418, node 0 sends a beacon 338 on the line 346. Following a designation by the curID information 442 on data storage 418 of node 0 to have a transmit opportunity on the line 346, the curID information 442 indicates node 1, and node 1 sends data 342 on the line 346. While node 1 is sending the data 342 on the line 346, the MAC of node 3 attempts to send data 342 as TXD signals 436 on the TXD line 412. In PLCA the MAC does not track transmit opportunities, and as a result the MAC is not informed of when a transmit opportunity of its node occurs. Accordingly, the MAC may provide transmit data to the PHY during any of the transmit opportunities of any of the nodes. In this example, the MAC of node 3 happens to assert the TX_EN signal 434 on line 410 and provides data 342 via the TXD line 412 as TXD signals 436 to the PHY of node 3 while node 1 is transmitting data on the line 346.

Since node 1 is currently sending data 342 on the line 346, however, a logical collision results (i.e., COL signal 440 associated with node 3 transitions high and a jam signal 444 is asserted in the TXD signals 436 of TXD line 412). Stated differently, the MAC of node 3 attempts to send data 342, however node 1 is sending data 342, resulting in a logical collision (i.e., COL signals 440 associated with node 3 transition high) and a jam signal 444. The jam signal is a 32 bit signal sent from the MAC to the PHY on the TXD line 412 to indicate to other nodes to drop the packet. By way of non-limiting examples, a jam signal 444 may include four bytes, or may include a number of bytes in the range of four to six bytes. As a result, should the PHY store the data 342 and the jam signal 444 in a buffer and later transmit a packet including the data 342 and the jam signal 444 on the line 346, the presence of the jam signal 444 in the packet may indicate to the other nodes that the packet should be dropped.

While the CRS signal 438 of the CRS line 414 of node 3 remains high, node 1 finishes sending the data 342 on the line 346, and the curID information 442 indicates node 2. The curID information 442 then indicates node 3. Subsequently, the CRS signal 438 of the node 3 signals 422 transitions from high 446 to low 448, after which node 3 may send a commit signal 344 and data 342 on the line 346. As illustrated in FIG. 4, the CRS signal 438 associated with node 3 is set high to prevent a MAC of node 3 from transmitting until its timeslot (i.e., curID information 442=3). Subsequently, the CRS signal 438 associated with node 3 is set to low to enable the MAC of node 3 to deliver a packet on TXD line 412 (after an inter-packet gap). Accordingly, the PHY 202 of node 3 kept the CRS signal 438 high during the silent period of node 2 until a TO of the PHY (PHY #3) was reached, at which point the PHY of node 3 transmitted the commit signal 344 on line 346 and deasserted the CRS signal 438 to the MAC of node 3. It is noted that, for PLCA, data may be received at a node over the line 346 from other nodes during a collision (COL) and/or jam (JAM). In this example, although there is a logical collision (MAC of node 3 attempts to transmit data while node 1 is transmitting data during its transmit opportunity), there is not a physical collision (PHY of node 3 does not transmit the data 342 received from the MAC on the line during the transmission of node 1), and node 3 transmit occurs after (e.g., immediately after) node 1 transmission with no additional delay (e.g., MAX backoff+latency<MIN packet size). As used herein the term "logical collision" refers to a transmission, by a MAC to a PHY, of transmit data to be transmitted to a shared transmission medium while another node is transmitting on the shared transmission medium.

As shown in FIG. 4, more than one node may receive data 342 from its MAC, however a node may not transmit the data 342 on line 346 until its transmit opportunity. Therefore, the node may store the data 342 ("store-and-forward") in a local (transmit) FIFO ("delay line") located in the respective PHY 202 until the node's timeslot occurs. For example, a FIFO may be programmable to include 49.5 bytes or less of storage or 64 bytes or less of storage, which may also be the size of a minimum Ethernet packet. The selection of 49.5 bytes or less of storage of the FIFO may prevent the FIFO from storing an entire packet (e.g., which may include 64 bytes, without limitation). As a result, since store-and-forward generally operates based on storage of an entire packet in the FIFO, store-and-forward operation may be prevented if the FIFO storage is programmably set at 49.5 bytes or less. In some examples, if, for example, a number of nodes in a network is relatively high (e.g., and thus a time duration between a node's TOs is relatively long) and/or a time duration before a node's TO (e.g., a node's TO is late in a cycle) (i.e., depending on the node's ID), a delay line (a TX FIFO) of the node may become full (e.g., programmably set to 49.5 bytes or less, or 64 bytes or less, without limitation) or near full. Even with only two nodes, a bus cycle may include, for example, up to 256 TOs (e.g., corresponding to an ID range). This may result in multiple problems, such as a buffer in a PHY of a node becoming full and late collision detection at the node. A late collision is a collision that occurs further into a packet transmission from the MAC to the PHY than is allowed by a governing standard. By way of non-limiting example, a late collision threshold may be programmably set to less than or equal to 49.5 bytes or 64 bytes. In PLCA, a FIFO depth should be at least a TO length multiplied by a number of nodes. Accordingly, emulating a collision without limiting the FIFO depth (e.g., limiting the FIFO depth to less than its full capacity) may result in a late collision. This may occur because if the FIFO depth is greater than the late collision threshold set by a governing standard, the FIFO may not become full until after the late collision threshold amount of data has already been transmitted. A FIFO depth is a maximum amount of data that the FIFO is capable of storing. In some embodiments, the FIFO depth may be limited to the late collision threshold (e.g., less than or equal to 49.5 bytes or 64 bytes, without limitation). The FIFO depth, however, may be allowed to vary, which means that the FIFO depth may be controllable. As a result, different nodes may use different FIFO depths including one node using different FIFO depths at different times.

FIG. 4 illustrates the interaction of the TXEN signal 434, the TXD signal 436, the CRS signal 438, and the COL signal 440. For example, the CRS signal 438 is asserted whenever the PHY detects activity on the line 346 (e.g., a carrier sensed on the line 346), when writing data to a FIFO of the PHY, or when the TX_EN signal 434 is asserted. In FIG. 4 the CRS signal 438 is asserted responsive to the data 342 from the TXD signal 436 being written to a FIFO of the PHY or responsive to assertion of the TX_EN signal 434 outside of a TO. Following an assertion of the COL signal 440 the CRS signal 438 is held asserted until a next transmit opportunity of the node. The COL signal 440 is asserted responsive to a detection, by the PHY, that another node (e.g., node 1) is already transmitting data 342 on the line 346 and that the MAC is transmitting data 342 on the TXD line 412. Accordingly, the PHY of node 3 holds the CRS signal 438 high until the TO of node 3. Responsive to the COL signal 440 the MAC backs off transmission of data on the TXD line 412. While the CRS signal 438 is asserted the MAC will hold off on providing transmit data 342 to the PHY. At the TO of node 3 the CRS signal 438 transitions low, which signals to the MAC that the TO of node 3 has arrived and node 3 may transmit data. The PHY provides the commit signal 344 to the line 346 to indicate that node 3 will transmit data 342 during its TO, and the MAC asserts the TXEN signal 434 and provides data 342 to the PHY. The PHY provides the data 342 to the line 346 following the commit signal 344.

According to various embodiments of the disclosure, a collision ("COL") may be emulated in response to a TX FIFO buffer nearing or reaching a full state. In other words, in response to an amount of data stored in a TX FIFO buffer being at least a predetermined threshold amount (e.g., the transmit FIFO is considered full, although it may physically be only near full), a collision may be emulated. As previously discussed, following assertion of a COL signal, (e.g., COL signal 440) the CRS signal (e.g., CRS signal 438) may remain asserted until the next TO of the node, which causes the MAC to refrain from providing transmit data to the PHY. Accordingly, asserting the COL signal responsive to the TX FIFO buffer nearing or reaching a full state causes the MAC to refrain from providing further transmit data to the already full TX FIFO buffer of the PHY. For example, the predetermined threshold amount may be programmably set to equal to or less than approximately 49.5 bytes or 64 bytes. In some of these embodiments, a carrier sense CRS and a collision COL may be asserted via an interface that provides for exclusive collision signaling (i.e., using a dedicated line for signaling that a collision was detected such as a dedicated line for COL, in an MII interface without limitation) from the PHY to the MAC (e.g., COL of a MII interface) so as to prevent further data 342 from being transferred from the MAC to its PHY.

Figure 5:
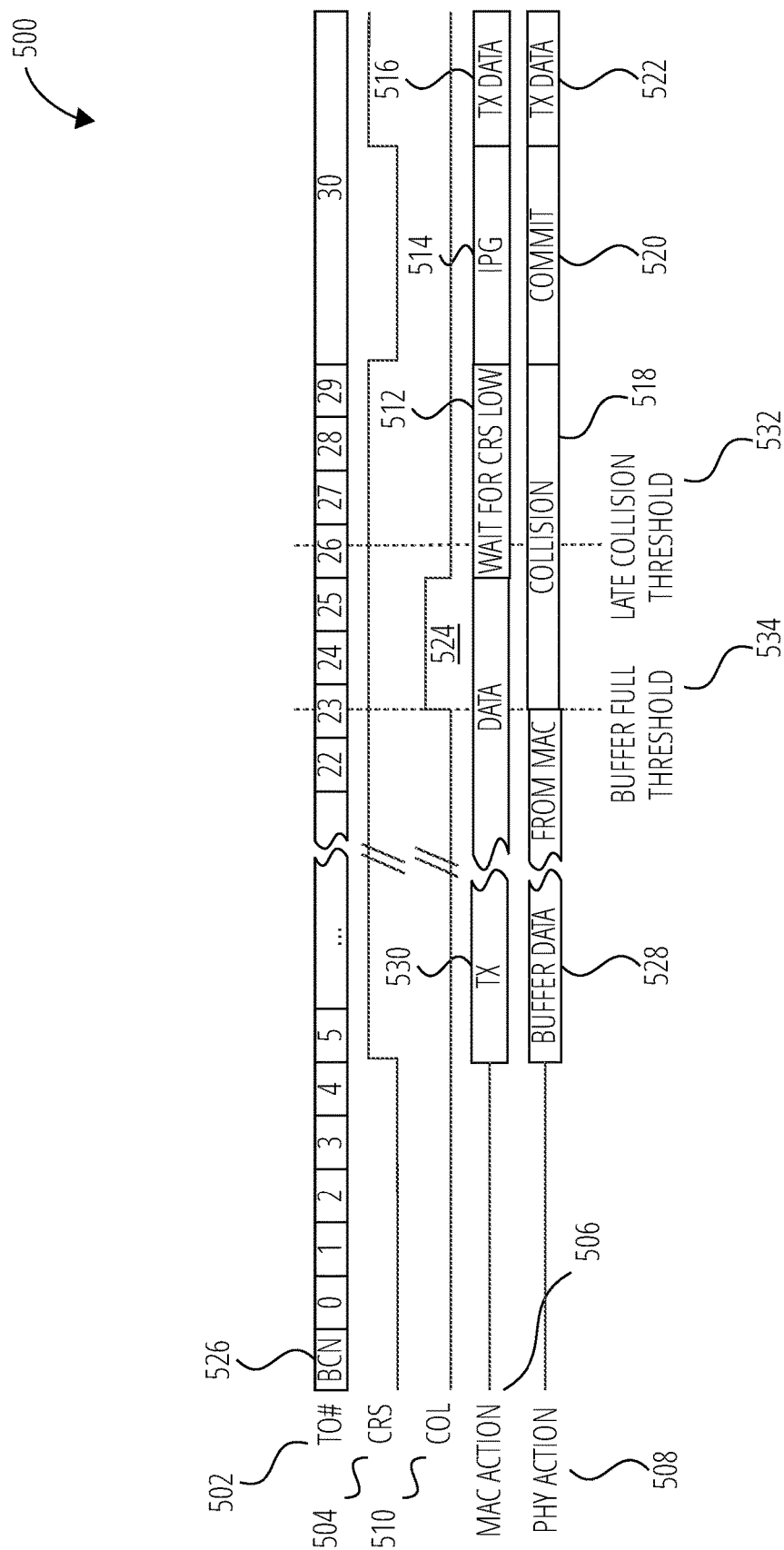
FIG. 5 depicts an example signal timing diagram associated with a node of a network including PLCA, in accordance with various embodiments of the disclosure.

FIG. 5 depicts an example signal timing diagram 500 associated with a node of a network including PLCA, in accordance with various embodiments of the disclosure. Signal timing diagram 500 depicts transmit opportunities (TOs 502 including a beacon 526 and TO 0 through TO 30), a CRS signal 504 associated with a carrier sense CRS of a node, and a COL signal 510 associated with a collision COL at the node. Signal timing diagram 500 also depicts acts of a MAC (MAC action 506) and a PHY (PHY action 508) of the node.

In signal timing diagram 500, at the beginning of TO #5 the MAC transmits 530 data to the PHY, the PHY buffers 528 the data received from the MAC, and the PHY transitions a carrier sense CRS signal 504 high responsive to the PHY buffering 528 the data from the MAC. Further, in this example, in response to a buffer (e.g., a transmit (TX) FIFO buffer) of the PHY becoming full or near full (e.g., at a buffer full threshold 534), a collision 518 may be emulated (as depicted by collision emulation 524), i.e., COL signal 510 is asserted. Further, the MAC waits 512 (e.g., in a backed-off state) for carrier sense CRS signal 504 to transition low (e.g., responsive to arrival of the next TO of the node at TO #30), and after an inter-packet gap (IPG 514), the MAC transmits 516 data. Further, after collision COL signal 510 and carrier sense CRS signal 504 transition low, the PHY may capture the bus (by transmitting a commit signal, commit 520, on the line) (i.e., to prevent other PHYs of other nodes from capturing the bus while waiting for the IPG 514). After the IPG 514, the PHY may transmit 522 the data.

Emulating a collision in response to a TX FIFO nearing or reaching a full state may prevent or decrease a likelihood of problems associated with TX FIFO data storage. Therefore, this embodiment may allow for additional nodes (e.g., PCLA nodes) (e.g., on a subnetwork). For example, various embodiments may allow for a large number of nodes (e.g., >32 nodes) on a 10SPE subnetwork with PLCA.

Another problem associated with 10SPE networks may be related to the use of precision time protocol (PTP) packets, which are time-sensitive packets. For PTP, timestamps referenced at an MII interface may assume a fixed link delay. However, PLCA includes a variable delay. Therefore, a PTP packet may suffer a variable delay in a PHY (e.g., due to the TX FIFO). Thus, conventional systems could not use PLCA and PTP together. Emulating a collision responsive to a detection, by a PHY, of a PTP packet received from the MAC may cause the MAC to back off and retransmit the PTP packet during a TO of the node to avoid delay associated with a FIFO buffer of the PHY.

According to some embodiments of the disclosure, a collision may be emulated to allow a MAC of a node to handle PTP clock synchronization using its native timestamp unit. More specifically, according to various embodiments, a PTP packet may be detected by a PHY at a node, and in response to detection of a PTP packet that may suffer a variable delay through a FIFO buffer, a collision may be emulated at the node (e.g., such that there is no delay through a transmit FIFO buffer of the node for the packet when it is retried after the collision, and as a result there is a fixed delay through the PHY of the node for the retried packet). More specifically, rather than hold the PTP packet in the FIFO buffer until a TO of the node resulting in a variable delay with respect to a timestamp of the PTP packet, an emulated collision is asserted, and once the emulated collision is deasserted the PTP packet is retried by the MAC with a new timestamp provided to the PTP packet. The emulate collision is deasserted at the TO of the respective node and thus the MAC may retransmit the PTP packet during the respective TO of its node. Accordingly, the use of collision emulation in this case prevents PTP packets from being held in a FIFO buffer, and instead enables the MAC to retransmit PTP packets during TOs of its node. This may occur because transmit packets that suffer collisions are retransmitted by the MAC with a new timestamp at a time when no FIFO delay is added.

Figure 6:
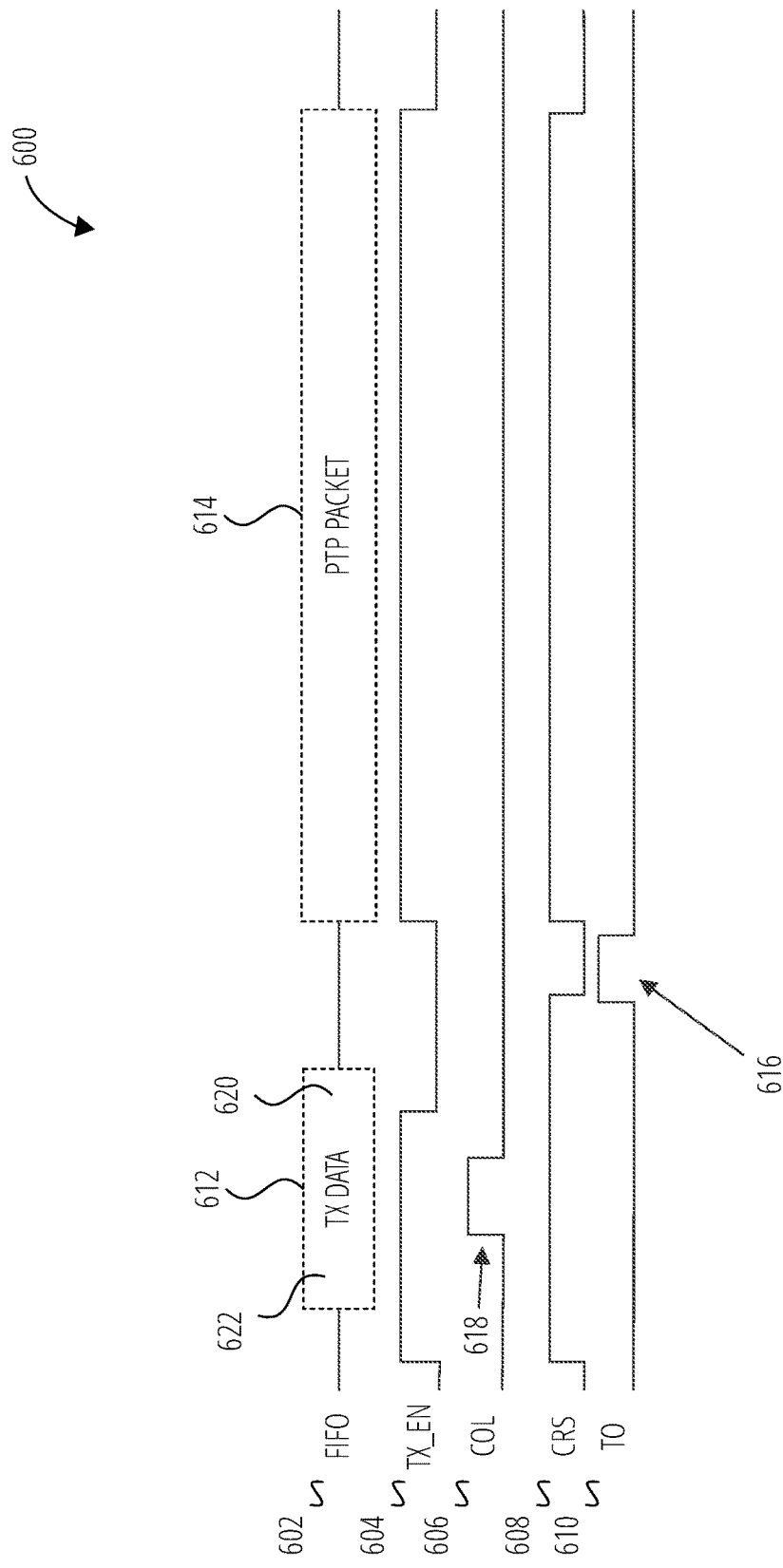
FIG. 6 depicts a signal timing diagram, wherein a PTP packet is received at a PHY of a node from a MAC of the node outside of a transmit opportunity (TO) for the node.

FIG. 6 depicts a signal timing diagram 600, wherein transmit data 612 of a PTP packet is received at a PHY of a node from a MAC of the node outside of a transmit opportunity (TO) for the node. In other words, it is not the node's TO when the PHY receives the transmit data 612 of the PTP packet from the MAC. Rather, as illustrated in signal timing diagram 600, the transmit data 612 is received at a FIFO buffer 602 of the PHY prior to the TO (indicated by a TO signal 610 at a logic level high 616) for the node. A TX_EN signal 604 is asserted signaling that the MAC is transmitting the transmit data 612. A CRS signal 608 is asserted responsive to the assertion of the TX_EN signal 604.

The PHY determines that the transmit data 612 is for a PTP packet. By way of non-limiting example, the PHY may detect a PTP header 622 in the transmit data 612. In response to determining that the transmit data 612 is for a PTP packet, a collision may be emulated (a transition 618 of a COL signal 606 from a logic level low to a logic level high). It is not important how long the COL signal 606 remains asserted as long as the COL signal 606 is deasserted when the TX_EN signal 604 is deasserted and the MAC backs off transmission of the transmit data 612 responsive to the assertion of the COL signal 606. A length of the COL signal 606, however, may be about four to six bytes long, without limitation. In some embodiments, as illustrated in FIG. 6, the COL signal 606 is deasserted before deassertion of the TX_EN signal 604 (e.g., TX_EN signal 604 may deassert twelve bytes after assertion of the COL signal 606). In some embodiments, however, the COL signal 606 may remain asserted until the MAC provides a JAM signal on the TXD line (not shown) or the TX_EN signal 604 is deasserted.

It is noted that the information identifying a packet received from the MAC for transmission by the PHY as a PTP packet may not be initially accessed. In other words, for example, the information identifying the packet as a PTP packet may be at byte 25 of the packet. Thus, it may take some amount of time for the PHY to determine that the packet is a PTP packet. Thus, in the example shown in FIG. 6, some of the transmit data 612 may already be stored on the FIFO 602 when it is determined that the transmit data 612 is for a PTP packet. Since the transmit data 612 is for a PTP packet the PHY may emulate a collision. As some of the transmit data 612 of the PTP packet, however, has already been stored to the FIFO 602, merely stopping storage of the transmit data 612 on the FIFO 602 may result in a runt packet (i.e., less than 49.5 bytes or 64 bytes), which may not be allowed (or recommended) to be transmitted on the line. Although a runt packet may be a packet having less than 64 bytes of payload (e.g., with an additional eight bytes of preamble), limiting a runt packet to less than 49.5 bytes may compensate for relatively large delays in the PHY and/or the network. As a result, according to various embodiments, the transmit data 612 may be "padded out." In this example, after byte number 25 arrives, and it is determined that the transmit data 612 being stored in the FIFO 602 is for a PTP packet, a collision may be emulated by transition 618 of COL signal 606 from a logic level low to a logic level high and the transmit data 612 may be padded out and an end-of-stream delimiter (ESD) error 620 may be added to the transmit data 612. For example, the padding may be selected to guarantee a cyclic redundancy check (CRC) error. More specifically, the padding may include 010101 to force a bad CRC. Further, according to at least some embodiments, an ESD error 620 (e.g., ESD ERR, not shown) may be added to the transmit data 612 (i.e., so that a receiving node knows that the transmit data 612, when transmitted on the line, is part of an error packet, in this case because the transmit data 612 has suffered an emulated collision and is corrupted). Stated another way, an end-of-stream delimiter (e.g., the ESD error 620) may be added to the transmit data 612.

Responsive to arrival of the TO 616 for the node the CRS signal 608 deasserts. At this point the PHY provides a commit signal (not shown) to the line to reserve the line until a PTP packet 614 is received from the MAC. Responsive to deassertion of the CRS signal 608 the MAC asserts the TX_EN signal 604 and provides the PTP packet 614 to the PHY. The PHY sets a depth of the FIFO to zero (corresponding to zero FIFO delay) during the TO 616 of the node and the FIFO 602 receives the PTP packet 614. With zero FIFO delay the PTP packet 614 is provided to the line (not shown). As a result, the PTP packet 614 is provided to the line with a fixed delay through the PHY. Other than the FIFO buffer, the PHY has a fixed delay associated therewith. As a result, the PHY may introduce a fixed delay to the PTP packet 614 (a delay from when the PTP packet 614 is received by the PHY from the MAC to when the PTP packet is transmitted on the line). Since the delay is fixed, a time stamp of the PTP packet may not become incorrect because the variable delay of the FIFO buffer has been avoided.

Figure 7:
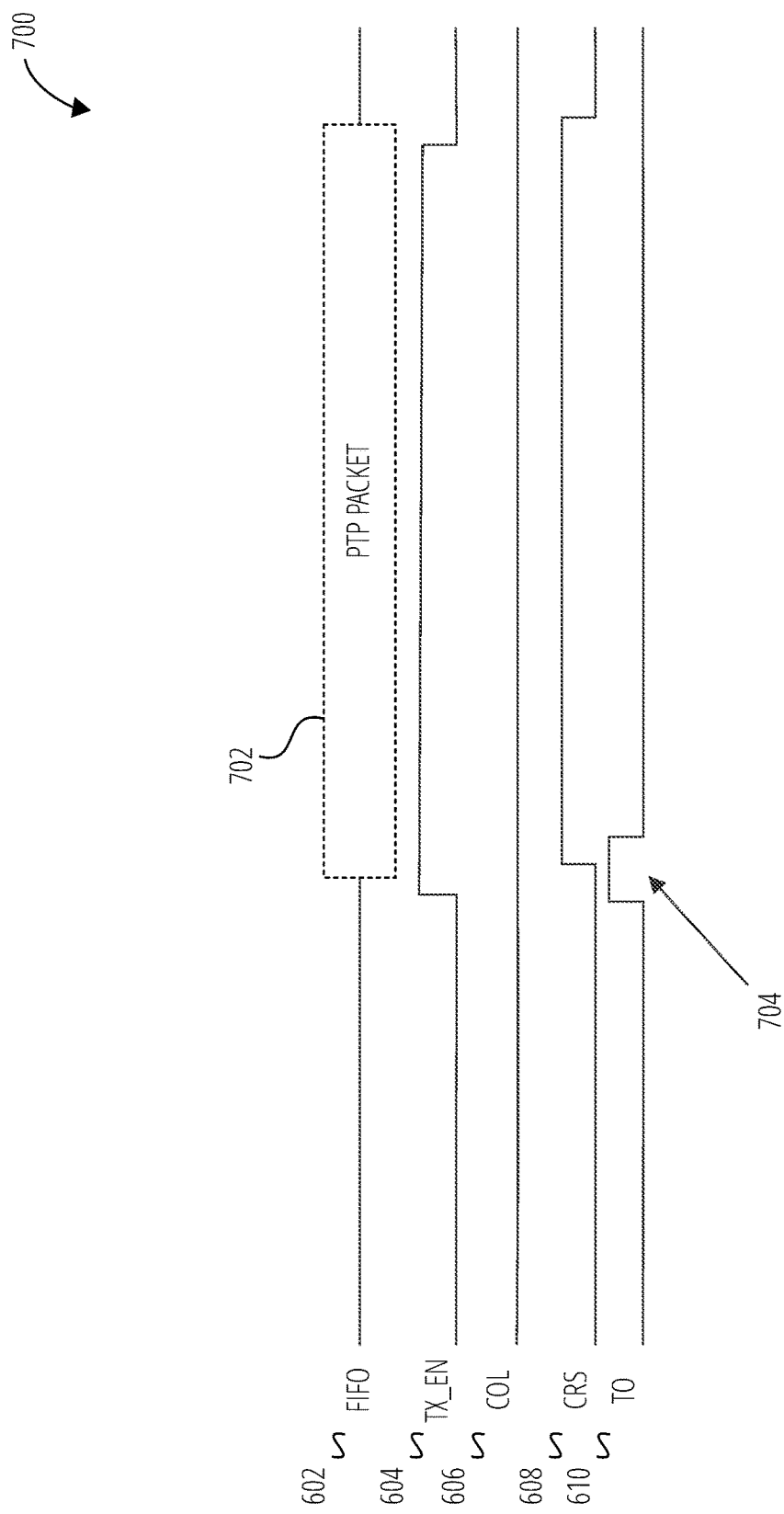
FIG. 7 depicts a signal timing diagram, wherein a PTP packet is received at a PHY of a node from a MAC of the node during a TO for the node.

FIG. 7 depicts a signal timing diagram 700, wherein a PTP packet 702 is received at a PHY of a node from a MAC of the node during a transmit opportunity (TO, indicated by a logic level high 704 of the TO signal 610) for the node. In this example, because the PTP packet 702 is received during the node's TO, an emulated collision may not be used. Although the PHY is not aware at the time of the logic level high 704 of the TO signal 610 that a packet (not shown) received at the FIFO 602 is a PTP packet 702, the PTP packet 702 incurs zero FIFO delay. Since the PTP packet 702 was received during the TO of the node's TO, even if the PHY determines that the received packet is a PTP packet 702 (e.g., at the 25$^{th}$ byte of the PTP packet 702), the COL signal 606 remains in a logic level low state. The balance of the signals have the meaning as described above in relation to FIG. 7. Alternatively, a collision may be emulated when the PHY determines that the received packet is a PTP packet even if it is the node's TO, and the PTP packet 702 may be sent at the node's next TO, preceded by COMMIT signals before the preamble of the PTP packet 702. As a result, in this alternative embodiment, the presence of the COMMIT signals may signal that a collision should not be emulated.

Figure 8:
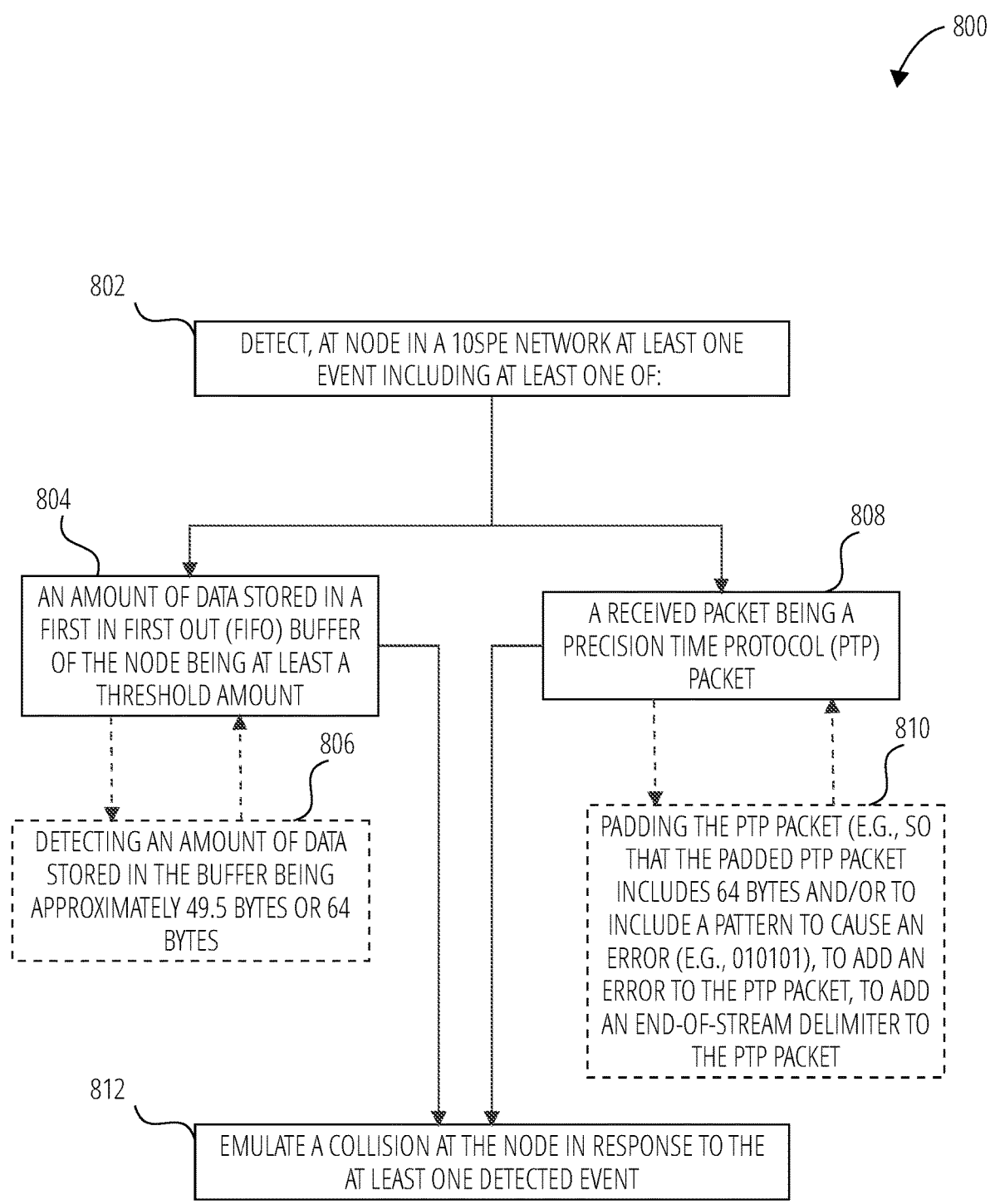
FIG. 8 is a flowchart of an example method of operating a network, such as a 10SPE network.

FIG. 8 is a flowchart of an example method 800 of operating a network, such as a 10SPE network. Method 800 may be arranged in accordance with at least one embodiment described in the present disclosure. Method 800 may be performed, in some embodiments, by a device or system, such as network 100 (see FIG. 1), node 200 (see FIG. 2), network 1202 (see FIG. 12), one or more of the components thereof, or another system or device. In these and other embodiments, method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

Method 800 may begin at block 802, wherein at least one event at a node in a network may be detected. For example, the network may include a 10SPE network implementing PLCA. The at least one event includes at least one of blocks 804 and 808. For example, the at least one event may include an amount of data stored in a TX FIFO buffer of the node being at least a threshold amount (block 804), which as indicated above may be described as the TX FIFO is full, and/or a packet received at the node (e.g., a PHY of the node) being a precision time protocol (PTP) packet (block 806). At block 804, the method includes an amount of data stored in a first in the FIFO buffer of the node being at least the threshold amount. For example, the threshold amount of data may be equal to or less than 49.5 bytes or 64 bytes. By way of non-limiting example, block 804 may include block 806. Block 806 includes detecting the amount of data stored in the buffer being approximately 49.5 bytes or 64 bytes. Responsive to the detection (block 802) of the amount of data stored in the FIFO buffer being at least the threshold amount (block 804), method 800 may proceed to block 812.

In some embodiments at block 802 detecting the at least one event includes detecting the received packet to be the PTP packet at block 808. In some such embodiments, block 808 includes padding the PTP packet, e.g., so that the padded PTP packet includes 64 bytes and/or to include a pattern to cause an error (e.g., 010101), or to add an end-of-stream delimiter to the PTP packet at block 810. Responsive to the detection (block 802) of the received packet being a PTP packet (block 808), method 800 may proceed to block 812.

At block 812, a collision at the node may be emulated in response to the at least one detected event. More specifically, in response to an amount of data stored in the TX FIFO buffer of the node being at least a threshold amount and/or a packet received at the node (e.g., a PHY of the node) being a precision time protocol (PTP) packet, a collision may be emulated. Further, for example, the collision may be emulated on a media independent interface (MII) or a reduced media independent interface (RMII) of the node.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 9:
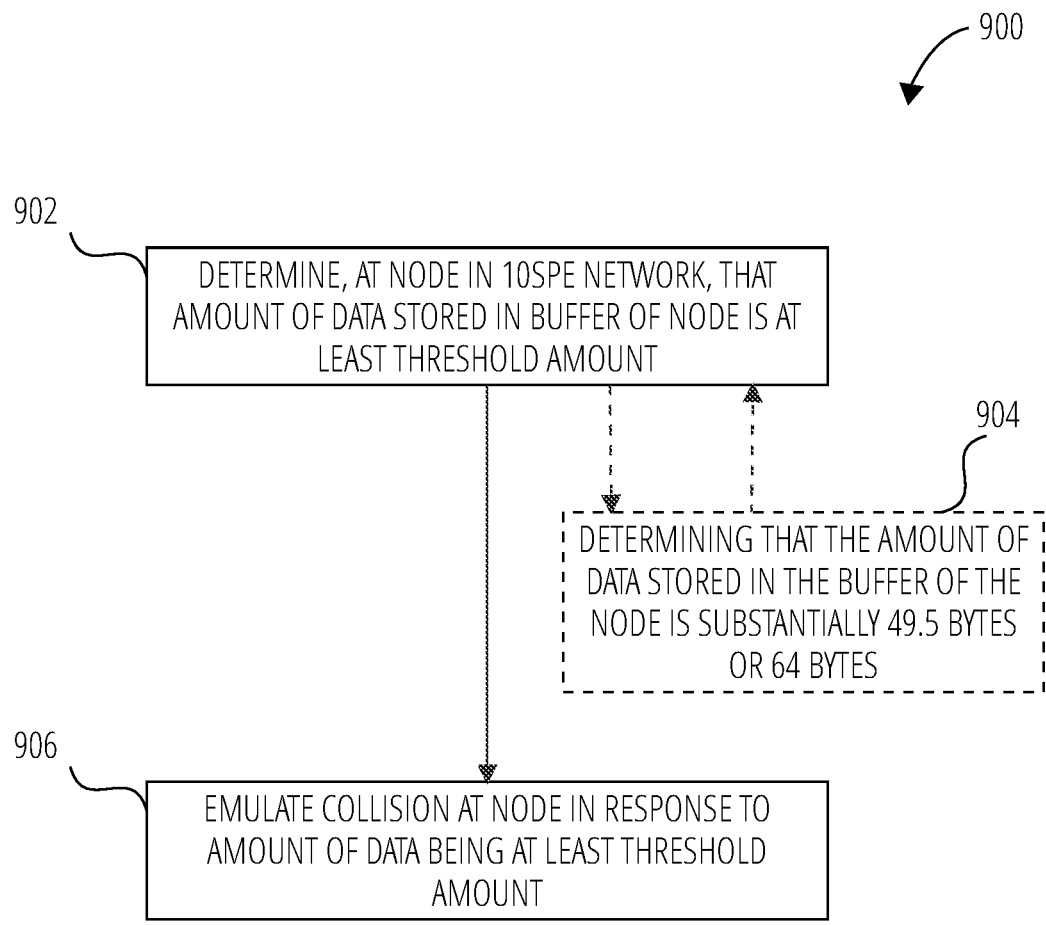
FIG. 9 is a flowchart illustrating a first method of operating a network node, according to some embodiments.

FIG. 9 is a flowchart illustrating a method 900 of operating a network node, according to some embodiments. In block 902, method 900 determines, at a node in a 10SPE network, that an amount of data stored in a buffer of the node is at least a threshold amount, which as indicated above may be described as the TX FIFO is full. In some embodiments determining that an amount of data stored in a buffer of the node is at least the threshold amount includes determining that the amount of data stored in the buffer of the node is substantially 49.5 bytes or 64 bytes, at block 904.

In block 906, method 900 emulates a collision at the node in response to the amount of data being at least the threshold amount. In some embodiments emulating a collision includes emulating the collision on a MII interface of the node.

Figure 10:
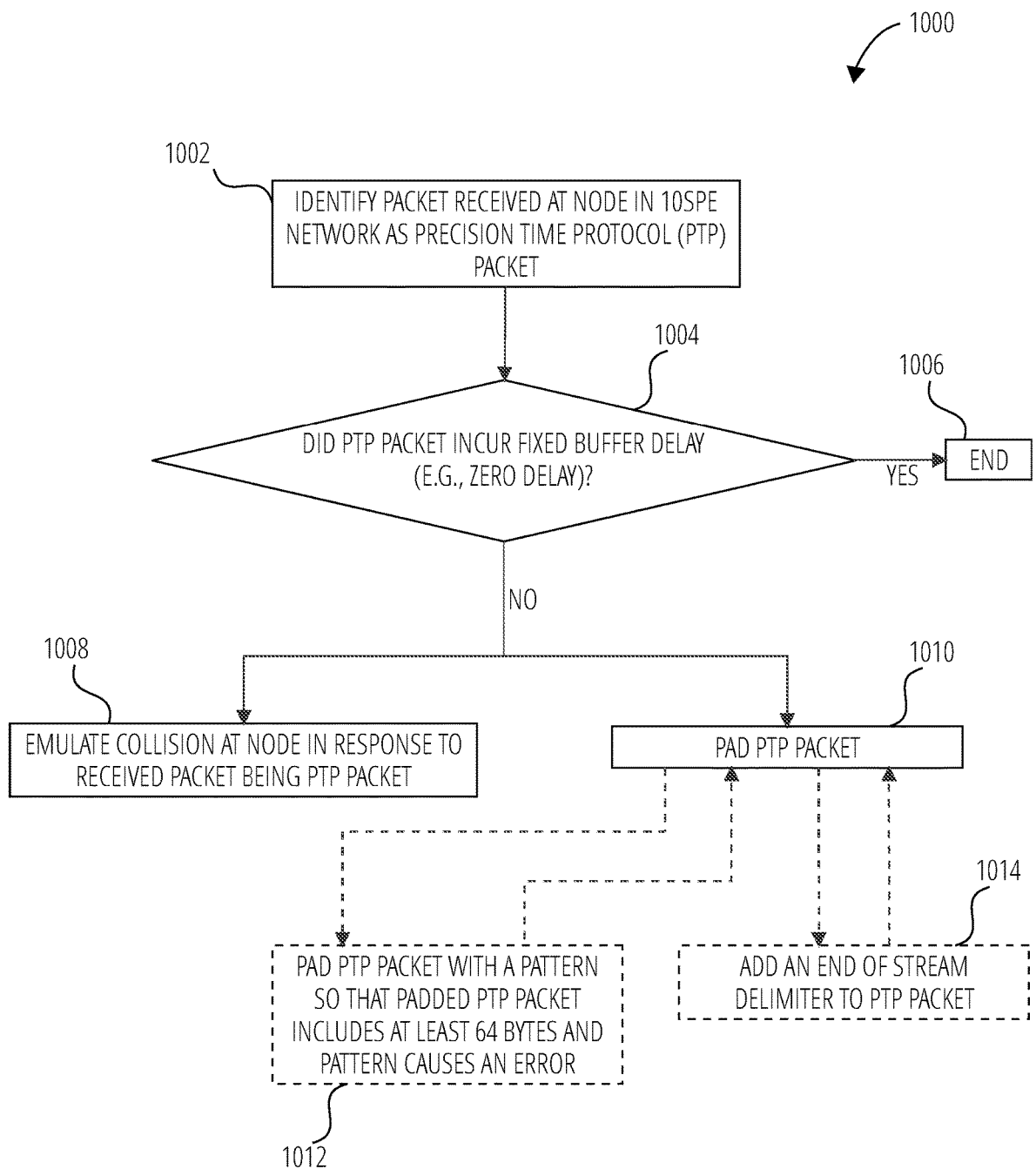
FIG. 10 is a flowchart illustrating a second method of operating a network node, according to some embodiments.

FIG. 10 is a flowchart illustrating a method 1000 of operating a network node, according to some embodiments. In block 1002, method 1000 identifies a packet received at a node in a 10SPE network as a precision time protocol (PTP) packet. In block 1004, method 1000 determines whether the PTP packet incurred fixed (e.g., zero, without limitation) buffer (e.g., FIFO) delay was received during a TO of the node. If yes, the method ends at block 1006 and the PTP packet is transmitted normally over to the shared transmission line. If, however, it is determined that the PTP packet did not incur fixed buffer delay, at block 1008 the method 800 emulates a collision at the node in response to the received packet being a PTP packet and the PTP packet not incurring fixed buffer delay. Also, at block 1010, method 800 pads the PTP packet.

In some embodiments block 1010, padding the PTP packet, includes block 1012, padding the PTP packet with a pattern so that padded PTP packet includes at least 64 bytes and the pattern causes an error. In some embodiments, block 1010, padding the PTP packet, includes block 1014, adding an end of stream delimiter to the PTP packet.

Figure 11:
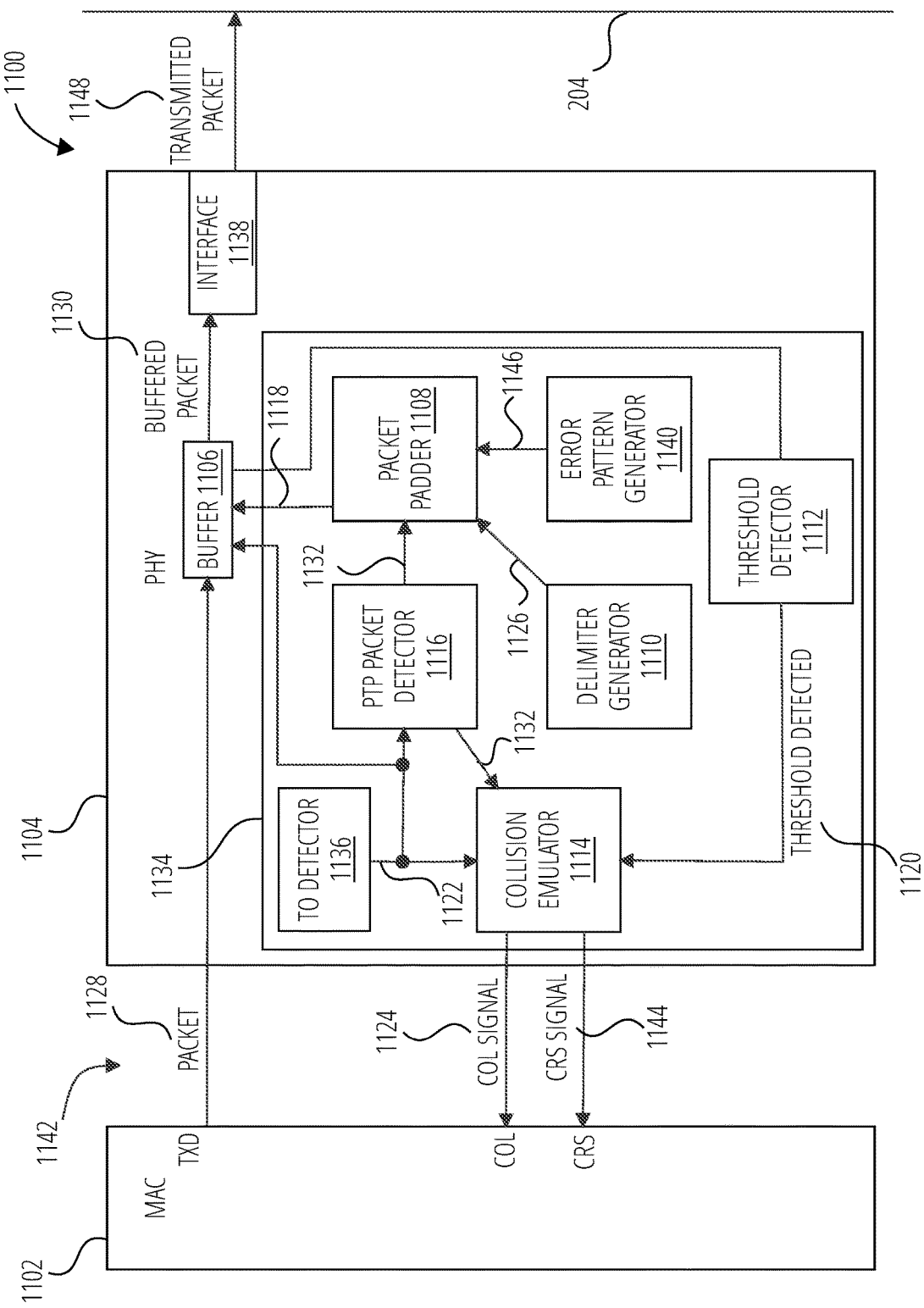
FIG. 11 is a functional block diagram of a node, according to some embodiments.

FIG. 11 is a functional block diagram of a node 1100, according to some embodiments. The node 1100 includes a MAC 1102 and a PHY 1104 operably coupled to the MAC 1102 (via an interface 1142, which may be an MII or RMII interface) and to a shared transmission media (e.g., the 10SPE media 204 of FIG. 2). The 10SPE media 204 may have multiple nodes (not shown) operably coupled thereto. The PHY 1104 is configured to receive a packet 1128 from the MAC 1102 (e.g., via a TXD signal of the interface 1142) and emulate a collision responsive to an event. For example, in some embodiments the event includes an amount of data stored in a buffer 1106 of the PHY 202 being at least a threshold amount (e.g., the buffer full threshold 534, or a buffer almost full threshold, without limitation). In some embodiments the event includes a detection that the packet 1128 received from the MAC 1102 is a PTP packet.

The PHY 1104 includes the buffer 1106 operably coupled to a control circuitry 1134. The control circuitry 1134 includes a transmit opportunity detector 1136, a packet padder 1108, a delimiter generator 1110, an error pattern generator 1140, a threshold detector 1112, a collision emulator 1114, and a PTP packet detector 1116. In some embodiments the buffer 1106 includes a FIFO buffer. Responsive to receipt of the packet 1128 from the MAC 1102 the packet 1128 is provided to the buffer 1106, which may have a controllable depth. The depth of the buffer 1106 may be controlled responsive to a TO signal 1122 from the transmit opportunity detector 1136. The transmit opportunity detector 1136 is configured to generate the TO signal 1122 to indicate whether or not it is currently a transmit opportunity of the node 1100. If the TO signal 1122 indicates that it is a transmit opportunity of the node 1100 the depth of the buffer 1106 may be set to zero. In such instances a buffered packet 1130 is routed from the buffer 1106 to the interface 1138, and in turn to the line 204 as a transmitted packet 1148 with zero buffer delay. If, however, the TO signal 1122 indicates that it is not a transmit opportunity of the node 1100 the depth of the buffer 1106 may be set to a non-zero value (e.g., a late collision threshold value). In such instances the buffer 1106 stores the packet 1128 and provides the buffered packet 1130 to the interface 1138, and in turn to the line 204 as a transmitted packet 1148 at the next TO of the node 1100.

The PTP packet detector 1116 is configured to receive the TO signal 1122 indicating whether the packet 1128 was received during a TO of the node 1100. The PTP packet detector 1116 is also configured to detect whether the packet 1128 received by the buffer 1106, when the TO signal 1122 is indicative that the packet 1128 was not received during a TO of the node 1100, is a PTP packet. The PTP packet detector 1116 is configured to provide a PTP detected signal 1132 indicating to the collision emulator 1114 and to the packet padder 1108 whether the packet 1128 is a PTP packet.

In some instances the packet padder 1108 is configured to pad the PTP packet 1128. For example, the packet padder 1108 may be configured to provide padding 1118 to be added to the packet 1128 in the buffer 1106 responsive to the PTP detected signal indicating that the packet 1128 is a PTP packet that was received outside of the TO of the node 1100. By way of non-limiting example, the padding 1118 may include a pattern 1146 (provided by an error pattern generator 1140) to cause an error (e.g., a cyclic redundancy check (CRC) error). As a specific, non-limiting example, the padding 1118 may include a 010101 pattern. Also by way of non-limiting example, the packet padder 1108 may be configured to add an error (e.g., provided by the error pattern generator 1140) to the packet 1128 in the buffer 1106. In some embodiments, the packet padder 1108 is configured to pad the packet 1128 with a pattern such that the packet 1128 includes at least 64 bytes and the pattern causes an error.

In some embodiments the packet padder 1108 is configured to pad the packet 1128 with a delimiter 1126 (e.g., generated by the delimiter generator 1110). The delimiter generator 1110 is configured to generate and provide delimiter 1126 to be added to the packet 1128 in buffer 1106. In some embodiments the delimiter 1126 includes an end-of-stream delimiter. Accordingly, the packet padder 1108 may be configured to add an end-of-stream delimiter to the packet 1128. Whether the packet padder 1108 adds padding 1118 including a pattern 1146 from the error pattern generator 1140 or a delimiter 1126 from the delimiter generator 1110, the padding enables a portion of a PTP packet received outside of a TO of the node 1100 to be padded out to avoid a runt packet being released to the line 204 responsive to a collision emulation.

A threshold detector 1112 is configured to detect an amount of data stored in the buffer 1106 while the buffer is set to a non-zero depth (i.e., outside of a TO of the node 1100). The threshold detector 1112 may be configured to compare the detected amount of data stored in the buffer 1106 to one or more threshold amounts. For example, a threshold amount may include an amount corresponding to a buffer full threshold (e.g., the buffer full threshold 534 of FIG. 5), a buffer almost full threshold, a late collision threshold 532 (FIG. 5), other threshold values, or any combination thereof. In some embodiments the buffer 1106 is configured to store 49.5 bytes or 64 bytes of data (e.g., the buffer depth is set to 49.5 bytes or 64 bytes), and a corresponding buffer full threshold is programmably set to less than or equal to 49.5 bytes or 64 bytes. Responsive to the threshold detector 1112 detecting that the amount of data stored in the buffer 1106 reaches or exceeds one or more threshold amounts (e.g., less than or equal to 49.5 bytes or 64 bytes), the threshold detector 1112 is configured to provide a threshold detected signal 1120 indicating that the one or more threshold amounts have been reached or exceeded. The threshold detector 1112 is configured to provide the threshold detected signal 1120 to the collision emulator 1114. As indicated above, when threshold detected signal 1120 is asserted, the buffer 1106 is described as full, irrespective of the threshold value.

The collision emulator 1114 is configured to receive the threshold detected signal 1120 from the threshold detector 1112, the PTP detected signal 1132 from the PTP packet detector 1116, and the TO signal 1122 from the transmit opportunity detector 1136. Accordingly, the collision emulator 1114 is informed of whether a packet 1128 received from the MAC 1102 is a PTP packet received during a TO of the node 1100, and whether the amount of data stored by the buffer 1106 exceeds the one or more thresholds. Using this information, the collision emulator 1114 is configured to emulate a collision at the node in response to at least one of the threshold detected signal 1120 or the PTP detected signal 1132. In some embodiments the collision emulator 1114 is configured to emulate a collision by asserting a COL signal 1124 and maintaining a CRS signal 1144 asserted until the next TO of the node 1100. In some embodiments the collision emulator 1114 is configured to emulate the collision by asserting the COL signal 1124 (e.g., transitioning the COL signal 1124 of the interface 1142 which may be an MII to a logic level high).

As previously discussed the collision emulator 1114 is also configured to receive the TO signal 1122. As also previously discussed the TO signal 1122 is asserted to signal that it is a transmit opportunity of the node 1100. Accordingly, the collision emulator 1114 may be configured to emulate the collision responsive to the PTP detected signal 1132 only if the TO signal 1122 is de-asserted (e.g., the PTP packet 1128 is received outside of the transmit opportunity of the node 1100).

In response to the TX_EN (not shown), the buffer 1106 buffers the packet 1128 to produce a buffered packet 1130 including at least a portion of the packet 1128 and any padding 1118 added thereto (e.g., padded out to a minimum packet length) to the interface 1138, which in turn provides the buffered packet 1130 to the 10SPE media 204 as a transmitted packet 1148 at an appropriate time (e.g., at the next TO of the node 1100, as indicated by the TO signal 1122). In other words, in response to the TX_EN signal, the packet 1128 is buffered and provided to the interface 1138 at the node's next TO. For example, the control circuitry 1134 is configured to provide the packet 1128 to the 10SPE media 204 without delay (i.e., setting a depth of the buffer 1106 to zero) responsive to the packet 1128 arriving while the TO signal 1122 is asserted. Accordingly, if the packet 1128 is a PTP packet (e.g., the first time the PTP packet is received from the MAC 1102, or a retransmission of a PTP packet that was previously received from the MAC) received during the TO of the node 1100, the PTP packet is delivered to the interface 1138 without being delayed by the buffer 1106, and as a result is transmitted as the transmitted packet 1148 to the 10SPE media 204 with a fixed delay. As another example, the buffer 1106 is configured to provide the buffered packet 1130 to the 10SPE media 204 (e.g., via the interface 1138 as the transmitted packet 1148) responsive to assertion of a transmit enable signal TX_EN from the MAC to the PHY (e.g., the TXEN signals 426 or the TXEN signals 434 of FIG. 4, the TX_EN signal 604 of FIG. 6). TX_EN signal may be asserted by the MAC following an emulated collision provided by the collision emulator 1114, which may be after deassertion of the CRS signal 1144 of the interface 1142.

Figure 12:
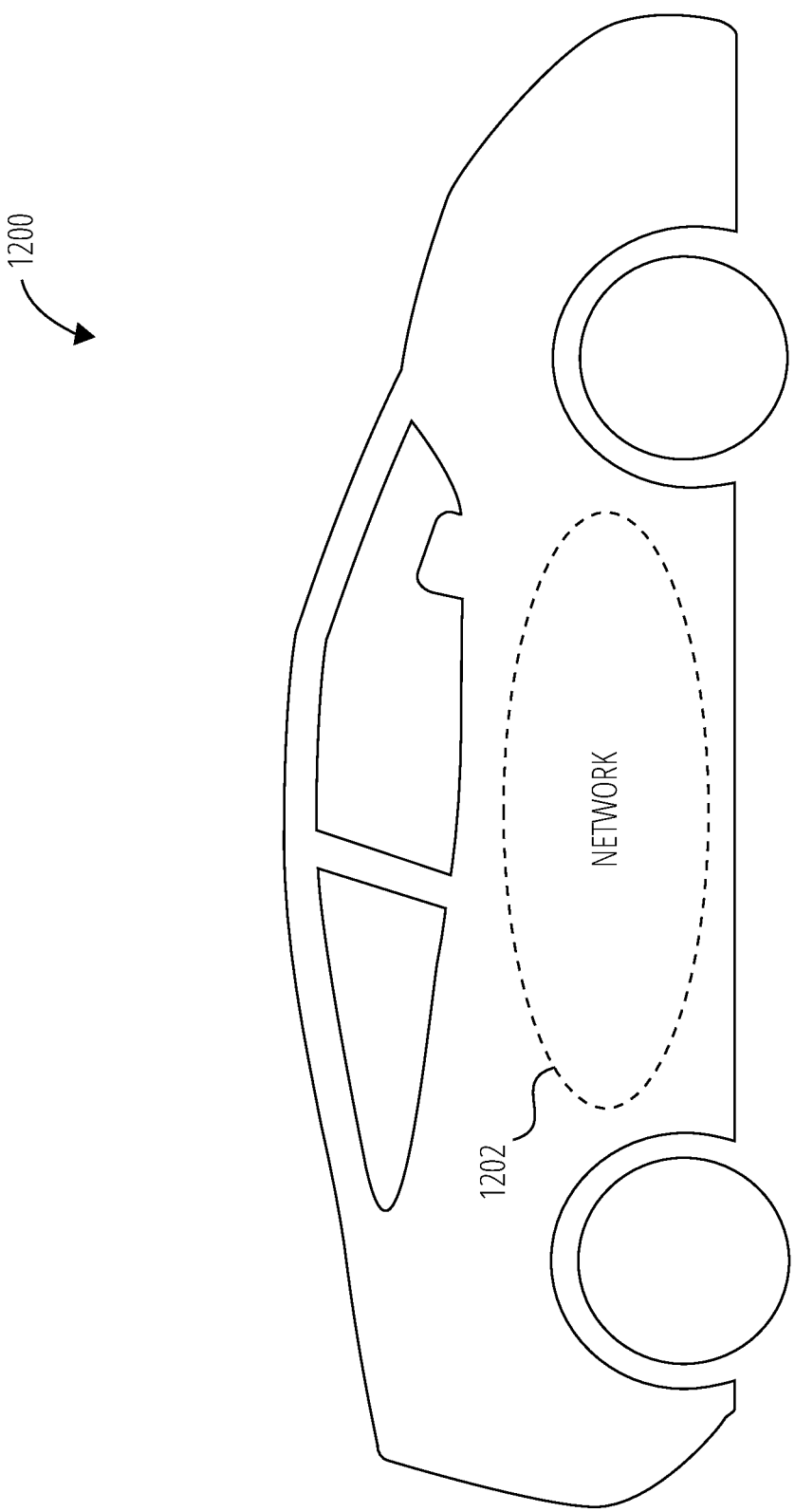
FIG. 12 depicts a vehicle including a network.

FIG. 12 depicts a vehicle 1200 (e.g., a truck, a bus, a ship, and/or an aircraft) including a network 1202 (e.g., a 10SPE network) having a number of nodes (e.g., amplifier(s), microphone(s), antenna(s), speaker(s), sensor(s), etc.). According to some embodiments, network 1202 may include a vehicle network. Further, in some embodiments, at least one node (e.g., a PHY of a node) may be configured to detect at least one event. The at least one event may include an amount of data stored in a FIFO buffer of the node being at least a threshold amount and/or a packet received at the node being a precision time protocol (PTP) packet. Further, the node may be configured to emulate a collision at the node in response to detecting the at least one event.

As disclosed herein, emulating a collision in response to a FIFO buffer of a node reaching a pre-determined threshold level may solve a problem associated with a large number of nodes on a network and/or a long time duration between transmit opportunities, as described herein. Further, emulating a collision may prevent a PTP packet from experiencing a variable delay through a transmit FIFO, as described herein.

Figure 13:
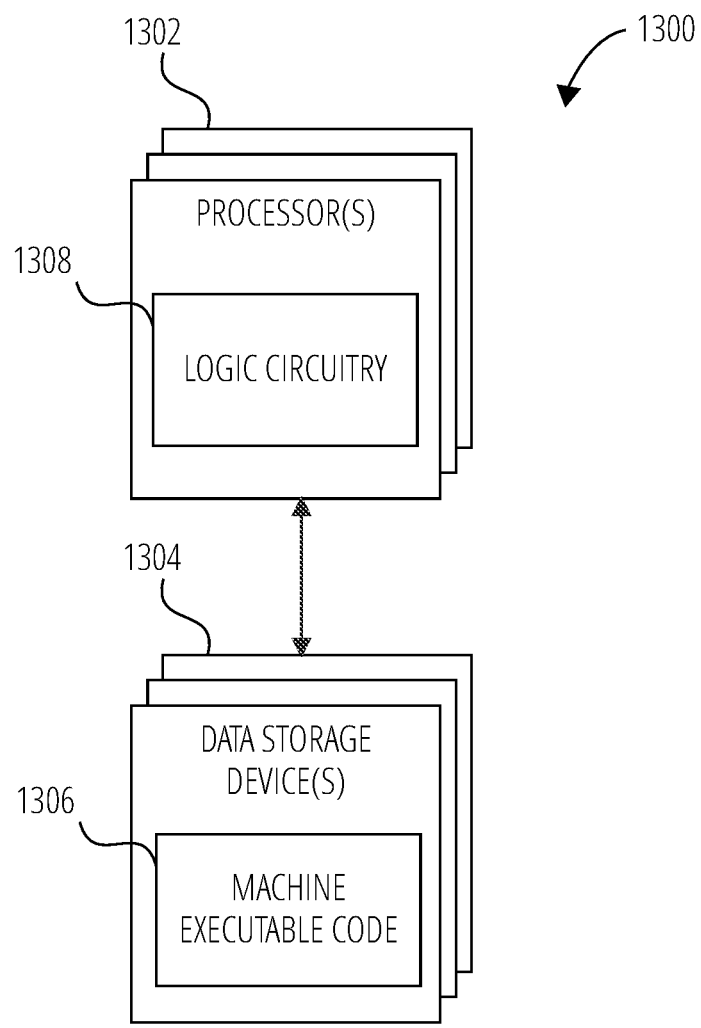
FIG. 13 is a block diagram of a computing device that may be used in some embodiments.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 13 illustrates non-limiting examples of implementations of functional elements disclosed herein. In some embodiments, some or all portions of the functional elements disclosed herein may be performed by hardware specially configured for carrying out the functional elements.

FIG. 13 is a block diagram of circuitry 1300 that, in some embodiments, may be used to implement various functions, operations, acts, processes, and/or methods disclosed herein. The circuitry 1300 includes one or more processors 1302 (sometimes referred to herein as "processors 1302") operably coupled to one or more data storage devices (sometimes referred to herein as "storage 1304"). The storage 1304 includes machine executable code 1306 stored thereon and the processors 1302 include logic circuitry 1308. The machine executable code 1306 includes information describing functional elements that may be implemented by (e.g., performed by) the logic circuitry 1308. The logic circuitry 1308 is adapted to implement (e.g., perform) the functional elements described by the machine executable code 1306. The circuitry 1300, when executing the functional elements described by the machine executable code 1306, should be considered as special purpose hardware configured for carrying out functional elements disclosed herein. In some embodiments the processors 1302 may be configured to perform the functional elements described by the machine executable code 1306 sequentially, concurrently (e.g., on one or more different hardware platforms), or in one or more parallel process streams.

When implemented by logic circuitry 1308 of the processors 1302, the machine executable code 1306 is configured to adapt the processors 1302 to perform operations of embodiments disclosed herein. For example, the machine executable code 1306 may be configured to adapt the processors 1302 to perform at least a portion or a totality of the method 800 of FIG. 8, the method 900 of FIG. 9 and/or the method 1000 of FIG. 10. As another example, the machine executable code 1306 may be configured to adapt the processors 1302 to perform at least a portion or a totality of the operations discussed for the PHY 202 of FIG. 2, and/or the control circuitry 1134 of FIG. 11. As a specific, non-limiting example, the machine executable code 1306 may be configured to adapt the processors 1302 to emulate a collision responsive to at least one detected event (e.g., a detection that a received packet is a PTP packet incurring variable delay, a detection that an amount of data stored in a buffer is at least a threshold amount, without limitation).

The processors 1302 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 1306 (e.g., software code, firmware code, hardware descriptions) related to embodiments of the present disclosure. It is noted that a general-purpose processor (may also be referred to herein as a host processor or simply a host) may be a microprocessor, but in the alternative, the processors 1302 may include any conventional processor, controller, microcontroller, or state machine. The processors 1302 may also be implemented as a combination of computing devices, such as a combination of a DSP and a microprocessor, a plurality of microprocessors, one or more microprocessors in conjunction with a DSP core, or any other such configuration.

In some embodiments the storage 1304 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1302 and the storage 1304 may be implemented into a single device (e.g., a semiconductor device product, a system on chip (SOC), etc.). In some embodiments the processors 1302 and the storage 1304 may be implemented into separate devices.

In some embodiments the machine executable code 1306 may include computer-readable instructions (e.g., software code, firmware code). By way of non-limiting example, the computer-readable instructions may be stored by the storage 1304, accessed directly by the processors 1302, and executed by the processors 1302 using at least the logic circuitry 1308. Also by way of non-limiting example, the computer-readable instructions may be stored on the storage 1304, transferred to a memory device (not shown) for execution, and executed by the processors 1302 using at least the logic circuitry 1308. Accordingly, in some embodiments the logic circuitry 1308 includes electrically configurable logic circuitry 1308.

In some embodiments the machine executable code 1306 may describe hardware (e.g., circuitry) to be implemented in the logic circuitry 1308 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1308 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 1306 may include an HDL, an RTL, a GL description, a mask level description, other hardware description, or any combination thereof.

In embodiments where the machine executable code 1306 includes a hardware description (at any level of abstraction), a system (not shown, but including the storage 1304) may be configured to implement the hardware description described by the machine executable code 1306. By way of non-limiting example, the processors 1302 may include a programmable logic device (e.g., an FPGA or a PLC) and the logic circuitry 1308 may be electrically controlled to implement circuitry corresponding to the hardware description into the logic circuitry 1308. Also by way of non-limiting example, the logic circuitry 1308 may include hard-wired logic manufactured by a manufacturing system (not shown, but including the storage 1304) according to the hardware description of the machine executable code 1306.

Regardless of whether the machine executable code 1306 includes computer-readable instructions or a hardware description, the logic circuitry 1308 is adapted to perform the functional elements described by the machine executable code 1306 when implementing the functional elements of the machine executable code 1306. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

A non-exhaustive, non-limiting list of example embodiments ("Examples") follows. Not all of the example embodiments listed below are individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1

A method, comprising: detecting, at node in a 10SPE network including a physical level collision avoidance (PLCA) sublayer, at least one event including at least one of: an amount of data stored in a first-in-first-out (FIFO) buffer of the node being at least a threshold amount; and a received packet being a precision time protocol (PTP) packet; and emulating a collision at the node in response to the at least one detected event.

Example 2

The method of Example 1, wherein detecting the at least one event comprises detecting the received packet being a precision time protocol (PTP) packet, the method further comprising padding the PTP packet to include at least 64 bytes.

Example 3

The method according to any one of Examples 1 and 2, wherein detecting the at least one event comprises detecting the received packet being a precision time protocol (PTP) packet, the method further comprising padding the PTP packet to include a pattern to cause an error.

Example 4

The method of Example 3, wherein padding the PTP packet to include a pattern comprises padding the PTP packet to include a pattern including 010101.

Example 5

The method of Example 1, wherein detecting the at least one event comprises detecting the received packet being a precision time protocol (PTP) packet, the method further comprising adding an error to the PTP packet.

Example 6

The method according to any one of Examples 1-5, wherein detecting the at least one event comprises detecting the received packet being a precision time protocol (PTP) packet, the method further comprising: padding the PTP packet with a pattern such that the PTP packet includes at least 64 bytes and the pattern causes an error; and adding an end-of-stream delimiter to the PTP packet.

Example 7

The method according to any one of Examples 1-6, wherein detecting comprises detecting the amount of data stored in the FIFO buffer being approximately 49.5 bytes or 64 bytes.

Example 8

A method, comprising: determining, at a node in a 10SPE network, that an amount of data stored in a buffer of the node is at least a threshold amount; and emulating a collision at the node in response to the amount of data being at least the threshold amount.

Example 9

The method of Example 8, wherein determining that an amount of data stored in a buffer of the node is at least the threshold amount comprises determining that the amount of data stored in a buffer of the node is substantially 49.5 bytes or 64 bytes.

Example 10

The method according to any one of Examples 8 and 9, wherein the 10SPE network includes more than 8 nodes.

Example 11

The method according to any one of Examples 8-10, wherein emulating a collision comprises emulating the collision on a media independent interface (MII) of the node.

Example 12

A method, comprising: identifying a packet received at a node in a 10SPE network as a precision time protocol (PTP) packet; and emulating a collision at the node in response to the received packet being a PTP packet.

Example 13

The method of Example 12, further comprising determining if the packet is received during a transmit opportunity (TO) of the node, wherein emulating the collision comprises emulating the collision at the node in response to received packet being a PTP packet and the packet being received outside of the TO.

Example 14

The method according to any one of Examples 12 and 13, further comprising at least one of: padding the PTP packet with a pattern such that the PTP packet includes at least 64 bytes and the pattern causes an error; and adding an end-of-stream delimiter to the PTP packet.

Example 15

The method according to any one of Examples 12-14, wherein emulating a collision comprises emulating the collision on a media independent interface (MII) of the node.

Example 15A

The method according to any one of Examples 12-14, wherein emulating a collision comprises emulating the collision on a reduced media independent (RMII) of the node.

Example 16

An 10SPE network, comprising: a node including a physical layer (PHY) including a physical level collision avoidance (PLCA) sublayer, the PHY configured to: detect at least one event including at least one of an amount of data stored in a first-in-first-out (FIFO) buffer of the node being at least a threshold amount and a received packet being a precision time protocol (PTP) packet; and emulate a collision at the node in response to the at least one detected event.

Example 17

The 10SPE network of Example 16, the PHY further configured to: pad the PTP packet with a pattern such that the PTP packet includes at least 64 bytes and the pattern causes a cyclic redundancy check (CRC) error; and add an end-of-stream delimiter to the PTP packet.

Example 18

The 10SPE network according to any one of Examples 16 and 17, wherein the received packet is received from a media access control (MAC) of the node.

Example 19

The 10SPE network according to any one of Examples 16-18, wherein the threshold amount is less than or equal to 49.5 bytes or 64 bytes.

Example 20

A vehicle including a 10SPE network, comprising: a number of nodes, at least one node of the number of nodes configured to: detect at least one event, the at least one event including at least one of: an amount of data stored in a first-in-first-out (FIFO) buffer of the node being at least a threshold amount; and a packet received at the node being a precision time protocol (PTP) packet; and emulate a collision at the node in response to the at least one detected event.

Example 21

A physical layer device for a network node, the physical layer device comprising: a buffer configured to receive a transmit packet provided by a media access control sublayer for transmission at a shared communication medium of a wired local area network, the physical layer device configured to implement a physical level collision avoidance (PLCA) sublayer; and control circuitry configured to: detect at least one event including at least one of: an amount of data stored by the buffer being at least a threshold amount, or the received transmit packet being a precision time protocol (PTP) packet incurring variable delay; and emulate a collision at the node by asserting a collision signal in response to the at least one detected event.

Example 22

The physical layer device of Example 21, wherein the control circuitry is configured to pad the PTP packet so as to include at least 64 bytes responsive to a detection that the received transmit packet is the PTP packet received outside of the transmit opportunity of the network node.

Example 23

The physical layer device according to any one of Examples 21 and 22, wherein the control circuitry is configured to pad the PTP packet to include a pattern to cause an error responsive to a detection that the received transmit packet is the PTP packet received outside of the transmit opportunity of the network node.

Example 24

The physical layer device of Example 23, wherein the pattern includes 010101.

Example 25

The physical layer device of Example 21, wherein the control circuitry is configured to add an error delimiter to the PTP packet responsive to a detection that the received transmit packet is the PTP packet received outside of the transmit opportunity of the network node.

Example 26

The physical layer device according to any one of Examples 21-25, wherein responsive to a detection that the received transmit packet is the PTP packet received outside of the transmit opportunity of the network node, the control circuitry is configured to: pad the PTP packet with a pattern such that the PTP packet includes at least 64 bytes of payload and the pattern causes an error; and add an end-of-stream delimiter to the PTP packet.

Example 26A

The physical layer device according to any one of Examples 21-26, wherein the control circuitry is configured to detect a fixed delay incurred by the PTP packet responsive to a transmit enable (TX_EN) signal assertion within a transmit opportunity of the network node or responsive to a deassertion of a carrier sense (CRS) signal after an emulated collision.

Example 27

The physical layer device according to any one of Examples 21-26A, wherein the buffer is configured to store 49.5 bytes or 64 bytes of data.

Example 28

The physical layer device according to any one of Examples 21-27, wherein a depth of the buffer is set to zero during transmit opportunities of the network node and to a non-zero value outside of transmit opportunities of the network node.

Example 29

A physical layer device for a network node, the physical layer device comprising: a buffer configured to store a transmit packet for transmission at a shared transmission medium of a wired local area network, the physical layer device configured to implement a physical level collision avoidance (PLCA) sublayer; and control circuitry configured to: determine that an amount of data stored in the buffer is at least a threshold amount; and emulate a collision by asserting a collision signal in response to the amount of data being at least the threshold amount.

Example 30

The physical layer device of Example 29, wherein the threshold amount is programmable to be a maximum of 49.5 bytes.

Example 31

The physical layer device according to any one of Examples 29 and 30, wherein the wired local area network includes more than eight (8) nodes.

Example 32

The physical layer device according to any one of Examples 29-31, wherein the control circuitry is configured to emulate the collision on a media independent interface (MII) or a reduced media independent interface (RMII).

Example 33

A physical layer device for a network node, the physical layer device comprising: a buffer configured to store a transmit packet received from a media access control sublayer for transmission at a shared transmission medium of a wired local area network, the wired local area network including a physical level collision avoidance (PLCA) sublayer; and control circuitry configured to: identify the stored transmit packet as a precision time protocol (PTP) packet; and emulate a collision at the node by asserting a collision signal to the media access control sublayer in response to the stored transmit packet being identified as the PTP and the identified PTP packet incurring a variable delay.

Example 34

The physical layer device of Example 33, wherein the control circuitry is further configured to emulate a collision by asserting the collision signal to the media access control sublayer in response to an amount of data stored by the buffer exceeding a predetermined threshold level.

Example 35

The physical layer device according to any one of Examples 33 and 34, wherein the control circuitry is further configured to at least one of: pad the PTP packet with a pattern such that the padded PTP packet includes at least 64 bytes and the pattern causes an error; or add an end-of-stream delimiter to the PTP packet.

Example 36

The physical layer device according to any one of Examples 33-35, wherein the control circuitry is configured to emulate the collision on a media independent interface (MII) or a reduced media independent interface (RMII).

Example 37

A wired local area network, comprising: a node including a physical layer (PHY), the PHY including a physical level collision avoidance (PLCA) sublayer, the PHY configured to: detect at least one event including at least one of an amount of data stored in a first-in-first-out (FIFO) buffer of the node being at least a threshold amount and a received packet being a precision time protocol (PTP) packet incurring variable delay.

Example 38

The wired local area network of Example 37, the PHY further configured to: pad the PTP packet with a pattern such that the padded PTP packet includes at least 64 bytes and the pattern causes a cyclic redundancy check (CRC) error; and add an end-of-stream delimiter to the PTP packet.

Example 39

The wired local area network according to any one of Examples 37 and 38, wherein the received packet is received from a media access control sublayer of the node.

Example 40

The wired local area network according to any one of Examples 17-19, wherein the threshold amount is programmable to be less than or equal to one of 49.5 bytes or 64 bytes.

Example 41

A vehicle including a wired local area network including a physical level collision avoidance (PLCA) sublayer, the wired local area network comprising: a number of nodes, at least one node of the number of nodes configured to: detect at least one event, the at least one event including at least one of: an amount of data stored in a first-in-first-out (FIFO) buffer of the node being at least a threshold amount; and a transmit packet received at the node from a link layer of the node being a precision time protocol (PTP) packet and incurring variable delay.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

We claim:

1. A physical layer device for a network node, the physical layer device comprising:
a buffer configured to receive a transmit packet provided by a media access control sublayer for transmission at a shared communication medium of a wired local area network, the physical layer device configured to implement a physical level collision avoidance (PLCA) sublayer; and
control circuitry configured to:
detect at least one event including at least one of:
an amount of data stored by the buffer being at least a threshold amount, or
the received transmit packet being a precision time protocol (PTP) packet incurring variable delay; and
emulate a collision at the network node by asserting a collision signal to the media access control sublayer in response to the at least one detected event.

2. The physical layer device of claim 1, wherein the control circuitry is configured to pad the PTP packet so as to include at least 64 bytes responsive to a detection that the received transmit packet is the PTP packet received outside of a transmit opportunity of the network node.

3. The physical layer device of claim 1, wherein the control circuitry is configured to pad the PTP packet to include a pattern to cause an error responsive to a detection that the received transmit packet is the PTP packet received outside of a transmit opportunity of the network node.

4. The physical layer device of claim 3, wherein the pattern includes 010101.

5. The physical layer device of claim 1, wherein the control circuitry is configured to add an error delimiter to the PTP packet responsive to a detection that the received transmit packet is the PTP packet received outside of a transmit opportunity of the network node.

6. The physical layer device of claim 1, wherein responsive to a detection that the received transmit packet is the PTP packet received outside of a transmit opportunity of the network node, the control circuitry is configured to:
 pad the PTP packet with a pattern such that the PTP packet includes at least 64 bytes of payload and the pattern causes an error; and
 add an end-of-stream delimiter to the PTP packet.

7. The physical layer device of claim 1, wherein the control circuitry is configured to detect a fixed delay incurred by the PTP packet responsive to a transmit enable (TX_EN) signal assertion within a transmit opportunity of the network node or responsive to a deassertion of a carrier sense (CRS) signal after an emulated collision.

8. A physical layer device for a network node, the physical layer device comprising:
 a buffer configured to store a transmit packet for transmission at a shared transmission medium of a wired local area network, the physical layer device configured to implement a physical level collision avoidance (PLCA) sublayer; and
 control circuitry configured to:
  determine that an amount of data stored in the buffer is at least a threshold amount; and
  emulate a collision by asserting a collision signal in response to the amount of data being at least the threshold amount.

9. The physical layer device of claim 8, wherein the threshold amount is programmable to be a maximum of 49.5 bytes.

10. The physical layer device of claim 8, wherein the wired local area network includes more than eight (8) nodes.

11. The physical layer device of claim 8, wherein the control circuitry is configured to emulate the collision on a media independent interface (MII).

12. A physical layer device for a network node, the physical layer device comprising:
 a buffer configured to store a transmit packet received from a media access control sublayer for transmission at a shared transmission medium of a wired local area network, the wired local area network including a physical level collision avoidance (PLCA) sublayer; and
 control circuitry configured to:
  identify the stored transmit packet as a precision time protocol (PTP) packet; and
  emulate a collision at the network node by asserting a collision signal to the media access control sublayer in response to the stored transmit packet being identified as the PTP packet and the identified PTP packet incurring variable delay.

13. The physical layer device of claim 12, wherein the control circuitry is further configured to emulate a collision by asserting the collision signal to the media access control sublayer in response to an amount of data stored by the buffer exceeding a predetermined threshold level.

14. The physical layer device of claim 12, wherein the control circuitry is further configured to at least one of:
 pad the PTP packet with a pattern such that the padded PTP packet includes at least 64 bytes and the pattern causes an error; or
 add an end-of-stream delimiter to the PTP packet.

15. The physical layer device of claim 12, wherein the control circuitry is configured to emulate the collision on a media independent interface (MII) or a reduced media independent interface (RMII).

16. A wired local area network, comprising:
 a node including a physical layer (PHY), the PHY including a physical level collision avoidance (PLCA) sublayer, the PHY configured to:
  detect at least one event including at least one of an amount of data stored in a first-in-first-out (FIFO) buffer of the node being at least a threshold amount and a received packet being a precision time protocol (PTP) packet incurring variable delay; and
  emulate a collision at the node in response to the at least one detected event.

17. The wired local area network of claim 16, the PHY further configured to:
 pad the PTP packet with a pattern such that the padded PTP packet includes at least 64 bytes and the pattern causes a cyclic redundancy check (CRC) error; and
 add an end-of-stream delimiter to the PTP packet.

18. The wired local area network of claim 16, wherein the received packet is received from a media access control sublayer of the node.

19. The wired local area network of claim 16, wherein the threshold amount is programmable to be less than or equal to one of 49.5 bytes or 64 bytes.

20. A vehicle including a wired local area network including a physical level collision avoidance (PLCA) sublayer, the wired local area network comprising:
 a number of nodes, at least one node of the number of nodes configured to:
  detect at least one event, the at least one event including at least one of: an amount of data stored in a first-in-first-out (FIFO) buffer of the node being at least a threshold amount; and a transmit packet received at the node from a link layer of the node being a precision time protocol (PTP) packet and incurring variable delay; and
  emulate a collision at the at least one node in response to the at least one detected event.

* * * * *